United States Patent
Wu et al.

(10) Patent No.: US 10,101,721 B2
(45) Date of Patent: Oct. 16, 2018

(54) SYSTEM AND METHOD FOR DETERMINING AN OPTIMIZED SCHEDULE OF A PRODUCTION LINE

(71) Applicant: Macau University of Science and Technology, Taipa, Macau (CN)

(72) Inventors: Naiqi Wu, Macau (CN); Fajun Yang, Macau (CN); Yan Qiao, Macau (CN); Mengchu Zhou, Macau (CN)

(73) Assignee: MACAU UNIVERSITY OF SCIENCE AND TECHNOLOGY, Taipa (MO)

( * ) Notice: Subject to any disclaimer, the term of this patent is extended or adjusted under 35 U.S.C. 154(b) by 431 days.

(21) Appl. No.: 14/920,026

(22) Filed: Oct. 22, 2015

(65) Prior Publication Data

US 2017/0115651 A1   Apr. 27, 2017

(51) Int. Cl.
*G05B 19/04* (2006.01)
*G05B 19/41* (2006.01)
(Continued)

(52) U.S. Cl.
CPC ... *G05B 19/0426* (2013.01); *G05B 19/41865* (2013.01); *G05B 2219/32291* (2013.01); *G05B 2219/45031* (2013.01); *Y10S 901/09* (2013.01)

(58) Field of Classification Search
CPC ...... G05B 19/4187; G05B 2219/45031; G05B 2219/50291; Y02P 90/02
See application file for complete search history.

(56) References Cited

U.S. PATENT DOCUMENTS 7,756,597 B2 * 7/2010 Van Den Nieuwelaar ................. G03F 7/70525
250/492.1
8,639,489 B2 * 1/2014 Pannese ........... G05B 19/41885
703/17
(Continued)

OTHER PUBLICATIONS

Lee, Y.-H.; Chang, C.-T.; Wong, D.S.-H. and Jang, S.-S., "Petri-Net Based Scheduling Strategy for Semiconductor Manufacturing Processes", 2010, The Institute of Chemical Engineers, Elsevier B.V.*
(Continued)

*Primary Examiner* — Mohammad Ali
*Assistant Examiner* — Kelvin Booker
(74) *Attorney, Agent, or Firm* — Renner Kenner Greive Bobak Taylor & Weber

(57) ABSTRACT

A method determines an optimized production schedule of a production line including a hybrid multi-cluster tool formed by a plurality of single-arm tools and dual-arm tools interconnected with each other. The method includes determining time for individual operations of a robotic arm and a processing module in the plurality of single-arm tools and dual-arm tools; determining robot waiting time of the single-arm tools and dual-arm tools based on the time for individual operations and different connection relationships of the plurality of single-arm tools and dual-arm tools; determining whether the optimized production schedule exists using the determined waiting time, wherein the optimized production schedule only exists if the hybrid multi-cluster tool is process-dominant where the robot activity time of the plurality of single-arm tools and dual-arm tools is substantially shorter than processing time at the processing module; and determining the optimized production schedule if the optimized production schedule exists.

14 Claims, 5 Drawing Sheets

(51) Int. Cl.
G05B 19/042 (2006.01)
G05B 19/418 (2006.01)

(56) References Cited

U.S. PATENT DOCUMENTS

| | | | | |
|---|---|---|---|---|
| 2003/0171835 A1* | 9/2003 | Suh | G05B 19/41865 | 700/95 |
| 2005/0102723 A1* | 5/2005 | Van Den Nieuwelaar | G03F 7/70525 | 718/1 |
| 2007/0017896 A1* | 1/2007 | Davis | G05B 19/41875 | 216/59 |
| 2008/0134076 A1* | 6/2008 | Pannese | G05B 17/02 | 715/772 |
| 2008/0155442 A1* | 6/2008 | Pannese | G05B 19/41885 | 715/771 |

OTHER PUBLICATIONS

Lin, S.-Y.; Fu, L.-C.; Chiang, T.-C. and Shen, Y.-S., "Colored Timed Petri-Net and GA Based Approach to Modeling and Scheduling for Wafer Probe Center", Sep. 14-19, 2003, Proceedings of the 2003 IEEE Intl Conf on Robotics and Automation.*
Aized, T., "Petri Net as a Manufacturing System Scheduling Tool, Advances in Petri Net Theory and Applications", Sep. 2010, ISBN 978-953-307-108-4, available from the Internet at: "www.intechopen.com".*
Qiao, Y.; Wu, N. and Zhou, M., "A Petri Net-Based Novel Scheduling Approach and Its Cycle Time Analysis for Dual-Arm Cluster Tools with Wafer Revisiting", Feb. 2013, IEEE Transactions on Semiconductor Manufacturing, vol. 26, No. 1.*
Qiao, Y.; Wu, N. and Zhou, M., "Real-Time Scheduling of Single-Arm Cluster Tools Subject to Residency Time Constraints and Bounded Activity Time Variation", Jul. 2012, IEEE Transactions on Automation Science and Engineering, vol. 9, No. 3.*
Zhu, Q. and Qiao, Y., "Scheduling Single-Arm Multi-Cluster Tools with Lower Bound Cycle Time via Petri Nets", Dec. 2012, Intl Journal of Intelligent Control and Systems, vol. 17, No. 4.*
Zuberek, W.M., "Timed Petri Nets in Modeling and Analysis of Cluster Tools", Oct. 2001, IEEE Transactions on Robotics and Automation, vol. 17, No. 5.*
Zuberek, W.M. and Kubiak, W., "Timed Petri Nets in Modeling and Analysis of Simple Schedules for Manufacturing Cells", 1999, Computers and Mathematics with Applications, 37, pp. 191-206.*
Yang, F.; Wu, Z.; Qiao, Y. and Zhou, M., "Petri Net-Based Optimal One-Wafer Cyclic Scheduling of Hybrid Multi-Cluster Tools in Wafer Fabrication", Sep. 6, 2013, IEEE Transactions on Semiconductor Manufacturing, vol. 27, No. 2.*
W. K. Chan, J. G. Yi, and S. W. Ding, "On the optimality of one-unit cycle scheduling of multi-cluster tools with single-blade robots," in Proc. IEEE Int. Conf. Auto. Sci. Eng., 392-397, Scottsdale, AZ, USA, 2007.
W. K. Chan, J. G. Yi, and S. W. Ding, "Optimal Scheduling of Multi-cluster Tools with Constant Robot Moving Times, Part I: Two-Cluster Analysis," IEEE Transactions on Automation Science and Engineering, vol. 8, No. 1, pp. 5-16, 2011.
W. K. Chan, J. G. Yi, S. W. Ding, and D. Z. Song, "Optimal Scheduling of Multi-cluster Tools with Constant Robot Moving Times, Part II: Tree-Like Topology Configurations," IEEE Transactions on Automation Science and Engineering, vol. 8, No. 1, pp. 17-28, 2011.
S. W. Ding, J. G. Yi, and M. T. Zhang, "Multicluster Tools Scheduling: an Integrated Event Graph and Network Model Approach," IEEE Transactions on Semiconductor Manufacturing, vol. 19, No. 3, pp. 339-351, 2006.
D. Jevtic, "Method and Apparatus for Managing Scheduling a Multiple Cluster Tool," in European Patent. vol. 1,132,792(A2), 2001.

D. Jevtic and S. Venkatesh, "Method and Apparatus for Scheduling Wafer Processing within a Multiple Chamber Semiconductor Wafer Processing Tool Having a Multiple Blade Robot," in U.S. Patent. vol. 6,224,638, 2001.
J.-H. Kim, T.-E. Lee, H.-Y. Lee, and D.-B. Park, Scheduling analysis of timed-constrained dual-armed cluster tools, IEEE Transactions on Semiconductor Manufacturing, vol. 16, No. 3, 521-534, 2003.
J.-H. Kim and T.-E. Lee, "Schedulability analysis of time-constrained cluster tools with bounded time variation by an extended Petri net," IEEE Trans. Autom. Sci. Eng., vol. 5, No. 3, pp. 490-503, Oct. 2008.
J.-H. Kim, M. C. Zhou, and T.-E. Lee, "Schedule Restoration for Single-Armed Cluster Tools," IEEE Trans. on Semiconductor Manufacturing, 27(3), pp. 388-399, Aug. 2014.
H.-Y. Lee and T.-E. Lee, "Scheduling single-arm cluster tools with reentrant wafer flows," IEEE Transactions on Semiconductor Manufacturing, vol. 19, No. 2, 226-240, 2006.
T.-E. Lee, H.-Y. Lee, and Y.-H. Shin, Workload balancing and scheduling of a single-armed cluster tool, in Proceedings of the 5th APIEMS Conference, Gold Coast, Australia, 1-15, 2004.
T.-E. Lee and S.-H. Park, "An extended event graph with negative places and tokens for time window constraints," IEEE Transactions on Automation Science and Engineering, vol. 2, No. 4, 319-332, 2005.
M.-J. Lopez and S.-C. Wood, Systems of multiple cluster tools—configuration, reliability, and performance, IEEE Transactions on Semiconductor Manufacturing, vol. 16, No. 2, 170-178, 2003.
T. L. Perkinson, R. S. Gyurcsik, and P. K. MacLarty, "Single-wafer cluster tool performance: An analysis of the effects of redundant chambers and revisitations sequences on throughput," IEEE Transactions on Semiconductor Manufacturing, vol. 9, No. 3, 384-400, 1996.
T. L. Perkinson, P. K. MacLarty, R. S. Gyurcsik, and R. K. Cavin, III, "Single-wafer cluster tool performance: An analysis of throughput," IEEE Transactions on Semiconductor Manufacturing, vol. 7, No. 3, 369-373, 1994.
Y. Qiao, N. Q. Wu, and M. C. Zhou, "Petri net modeling and wafer sojourn time analysis of single-arm cluster tools with residency time constraints and activity time variation," IEEE Transactions on Semiconductor manufacturing, vol. 25. No. 3, 432-446, 2012.
Y. Qiao, N. Q. Wu, and M. C. Zhou, "Real-time scheduling of single-arm cluster tools subject to residency time constraints and bounded activity time variation," IEEE Transactions on Automation Science and Engineering, vo. 9, No. 3, 564-577, 2012.
S.P. Sethi, C. Sriskandarajah, G. Sorger, J. Blazewicz, and W. Kubiak, "Sequencing of parts and robot moves in a robotic cell," Int. J. Flexible Manuf. Syst., vol. 4, No. 3-4, pp. 331-358, 1992.
S. Venkatesh, R. Davenport, P. Foxhoven, and J. Nulman, "A steady-state throughput analysis of cluster tools: Dual-blade versus single-blade robots," IEEE Trans. Semi-conduct. Manuf., vol. 10, No. 4, pp. 418-424, 1997.
N. Q. Wu, "Necessary and Sufficient Conditions for Deadlock-free Operation in Flexible Manufacturing Systems Using a Colored Petri Net Model," IEEE Transaction on Systems, Man, and Cybernetics, Part C, vol. 29, No. 2, pp. 192-204, 1999.
N. Q. Wu, C. B. Chu, F. Chu, and M. C. Zhou, "A Petri net method for schedulability and scheduling problems in single-arm cluster tools with wafer residency time constraints," IEEE Transactions on Semiconductor Manufacturing, vol. 21, No. 2, pp. 224-237, 2008.
N. Q. Wu, F. Chu, C. Chu, and M. Zhou, "Petri Net-Based Scheduling of Single-Arm Cluster Tools With Reentrant Atomic Layer Deposition Processes," IEEE Transactions on Automation Science and Engineering, vol. 8, No. 1, pp. 42-55, Jan. 2011.
N. Q. Wu, F. Chu, C. B. Chu, and M. C. Zhou, "Petri net modeling and cycle-time analysis of dual-arm cluster tools with wafer revisiting," IEEE Transactions on Systems, Man, & Cybernetics: Systems, vol. 43, No. 1, 196-207, 2013.
N. Q. Wu and M. C. Zhou, "Avoiding deadlock and reducing starvation and blocking in automated manufacturing systems," IEEE Transactions on Robotics and Automation, vol. 17, No. 5, 658-669, 2001.

(56) References Cited

OTHER PUBLICATIONS

N. Q. Wu and M. C. Zhou, "System modeling and control with resource-oriented Petri nets", CRC Press, Taylor & Francis Group, New York, Oct. 2009.

N. Q. Wu and M. C. Zhou, "Analysis of wafer sojourn time in dual-arm cluster tools with residency time constraint and activity time variation," IEEE Transactions on Semiconductor Manufacturing, vol. 23, No. 1, pp. 53-64, 2010.

N. Q. Wu and M. C. Zhou, "A closed-form solution for schedulability and optimal scheduling of dual-arm cluster tools with wafer residency tome constraint based on steady schedule analysis," IEEE Transactions on Automation Science and Engineering, vol. 7, No. 2, 303-315, 2010.

N. Q. Wu and M. C. Zhou, "Process vs resource-oriented Petri net modeling of automated manufacturing systems", Asian Journal of Control, vol. 12, No. 3, 267-280, 2010.

N. Q. Wu and M. C. Zhou, "Modeling, analysis and control of dual-arm cluster tools with residency time constraint and activity time variation based on Petri nets," IEEE Transactions on Automation Science and Engineering, vol. 9, No. 2, 446-454, 2012.

N. Q. Wu and M. C. Zhou, "Schedulability analysis and optimal scheduling of dual-arm cluster tools with residency time constraint and activity time variation," IEEE Transactions on Automation Science and Engineering, vol. 9, No. 1, 203-209, 2012.

N. Q. Wu, M. C. Zhou, F. Chu, and C. B. Chu, "A Petri-net-based scheduling strategy for dual-arm cluster tools with wafer revisiting," IEEE Transactions on Systems, Man, and Cybernetics: Systems, vol. 43, No. 5, 1182-1194, 2013.

F. J. Yang, N. Q. Wu, Y. Qiao, and M. C. Zhou, "Petri net-based optimal one-wafer cyclic scheduling of hybrid multi-cluster tools in wafer fabrication," IEEE Transactions on Semiconductor Manufacturing, vol. 27, No. 2, pp. 192-203, 2014.

F. J. Yang, N. Q. Wu, Y. Qiao, and M. C. Zhou, "Petri net-based polynomially complex approach to optimal one-wafer cyclic scheduling of hybrid multi-cluster tools in semiconductor manufacturing," IEEE Transactions on System, Man, and Cybernetics: System, vol. 44, No. 12, pp. 1598-1610, 2014.

J. G. Yi, S. W. Ding, D. Z. Song, and M. T. Zhang, "Steady-State Throughput and Scheduling Analysis of Multi-Cluster Tools: A Decomposition Approach," IEEE Transactions on Automation Science and Engineering, vol. 5, No. 2, pp. 321-336, 2008.

M. C. Zhou and K. Venkatesh, "Modeling, simulation and control of flexible manufacturing systems: A Petri net approach," World Scientific, Singapore, 1998.

Q. H. Zhu, N. Q. Wu, Y. Qiao, and M. C. Zhou, "Petri net-based optimal one-wafer scheduling of single-arm multi-cluster tools in semiconductor manufacturing," IEEE Transactions on Semiconductor Manufacturing, vol. 26, No. 4, 578-591, 2013.

Q. H. Zhu, N. Q. Wu, Y. Qiao, and M. C. Zhou, "Scheduling of single-arm multi-cluster tools with wafer residency time constraints in semiconductor manufacturing," IEEE Transactions on Semiconductor Manufacturing, vol. 28, No. 1, 117-125, 2015.

W. M. Zuberek, "Timed Petri nets in modeling and analysis of cluster tools," IEEE Transactions on Robotics and Automation, vol. 17, No. 5, pp. 562-575, Oct. 2001.

* cited by examiner

SYSTEM AND METHOD FOR DETERMINING AN OPTIMIZED SCHEDULE OF A PRODUCTION LINE

TECHNICAL FIELD

The present invention relates to a system and method for determining an optimized schedule of a production line and particularly, although not exclusively, to a system and method for determining an optimized schedule of a semiconductor production line with a hybrid multi-cluster tool having both single arm tools and dual arm tools.

BACKGROUND

Cluster tools have been widely used to process objects such as semiconductor wafers for fabricating microelectronic components. Generally, a cluster tool is a robotic processing system that includes loading and unloading modules and a number of different processing modules (PM) placed around a central automated handling unit with one or more robotic arms. It operates by using the robotic arm to transfer the object to be processed from the loading/unloading loadlocks to different processing modules in sequence so as to perform different mechanical or chemical processing, and then back to the loading/unloading loadlocks. The time for the object to stay in the processing module depends on the time needed for a specific processing procedure.

Multi-cluster tools formed by interconnecting cluster tools have also been used for processing and manufacturing objects. Comparing with a single cluster tool, a multi-cluster tool may provide more PMs for manufacturing products of high degree of complexity. In some cases, these tools may also simultaneously process more than one product to provide improved processing efficiency.

Although multi-cluster tools appear to offer some advantages over single-cluster tools, they may include combinations of different types of single-cluster tools (e.g., both single-arm cluster tools and dual-arm cluster tools) which are of different constructions and different scheduling mechanisms. As a result, it would be difficult to determine an optimal scheduling of these tools for maximum operation efficiency.

SUMMARY OF THE INVENTION

In accordance with a first aspect of the present invention, a method is provided for determining an optimized production schedule of a production line, the production line comprises a hybrid multi-cluster tool formed by a plurality of single-arm tools and dual-arm tools interconnected with each other; wherein each single-arm tool includes one robotic arm for manipulating an object and at least one processing module for processing the object or a buffering module for holding the object, and each dual-arm tool includes two robotic arms for manipulating an object and at least one processing module for processing the object or a buffering module for holding the object; single-arm tools and dual-arm tools are connected with each other through at least one buffering module; the method comprising the steps of: determining time for individual operations of the robotic arm and the processing module in the plurality of single-arm tools and dual-arm tools; determining robot waiting time of the single-arm tools and dual-arm tools based on the time for individual operations and different connection relationships of the plurality of single-arm tools and dual-arm tools; determining whether the optimized production schedule exists using the determined robot waiting time, wherein the optimized production schedule only exists if the hybrid multi-cluster tool is process-dominant where robot activity time of the plurality of single-arm tools and dual-arm tools is substantially shorter than processing time at the processing module; and determining the optimized production schedule if the optimized production schedule exists.

In one embodiment of the first aspect, the step of determining the time for individual operations of the robotic arm and the processing module in the plurality of single-arm tools and dual-arm tools comprises the step of determining one or more of: a time required for the robotic arm of the single-arm tool to load or unload the object; a time required for the robotic arms of the dual-arm tool to swap; a time required for the robotic arm of the single-arm tool or the dual-arm tool to move while holding the object; a time required for the robotic arm of the single-arm tool to move without holding an object; a time required for processing the object in the processing module of the single-arm tool or the dual-arm tool; a time required for resting the object in the processing module of the single-arm tool or the dual-arm tool; a time required for the robotic arm of the single-arm tool to wait before unloading the object; a time required for the robotic arms of the dual-arm tool to wait at the processing module of the dual-arm tool; and a time required for the robotic arms of the dual-arm tool to wait during swap at the processing module of the dual-arm tool.

In one embodiment of the first aspect, the different connection relationships comprise: an upstream downstream relationship that includes an upstream single-arm tool and downstream single-arm tool connection, an upstream single-arm tool and a downstream dual-arm tool connection, an upstream dual-arm tool and a downstream single-arm tool connection, or an upstream dual-arm tool and a downstream dual-arm tool connection; and a number relationship that includes a number of adjacent single-arm or the dual-arm tools of which the respective single-arm tool or the dual-arm tool is connected to.

In one embodiment of the first aspect, the step of determining whether the optimized production schedule exists using the time for individual operations and the robot waiting time comprises: calculating an activity time of each of the single-arm tools and dual-arm tools in a production cycle without robot waiting using the time for individual operations; calculating a fundamental period of each of the single-arm tools and dual-arm tools using the time for individual operations; determining a maximum fundamental period from the calculated fundamental periods; determining a robot waiting time of each of the plurality of single-arm tools and dual-arm tools using the maximum fundamental period; evaluating the robot waiting time determined so as to determine if the optimized production schedule exists.

In one embodiment of the first aspect, the step of determining the optimized production schedule comprises setting an optimal robot waiting time for each of the plurality of single-arm tools and dual-arm tools based on the determination results without interfering with the operation of the buffering modules.

In one embodiment of the first aspect, the hybrid multi-cluster tool has a non-cyclic treelike structure with at least one of the single arm tools and dual arm tools being connected with three or more adjacent single arm tools and dual arm tools.

In one embodiment of the first aspect, the optimized production schedule comprises a shortest time for completion of a cycle of production of the object.

In one embodiment of the first aspect, the object is a semiconductor and the production line is a semiconductor manufacturing line.

In accordance with a second aspect of the present invention, there is provided a computerized system arranged to determine an optimized production schedule of a production line, the production line comprises a hybrid multi-cluster tool formed by a plurality of single-arm tools and dual-arm tools interconnected with each other; wherein each single-arm tool includes one robotic arm for manipulating an object and at least one processing module for processing the object or a buffering module for holding the object, and each dual-arm tool includes two robotic arms for manipulating an object and at least one processing module for processing the object or a buffering module for holding the object; each single-arm tools and dual-arm tools are connected with each other through at least one buffering module; the computerized system comprises a Petri-Net (PN) model computation module arranged for: determining time for individual operations of the robotic arm and the processing module in the plurality of single-arm tools and dual-arm tools; determining the robot waiting time of the single-arm tools and dual-arm tools based on the time for individual operations and different connection relationships of the plurality of single-arm tools and dual-arm tools; determining whether the optimized production schedule exists using the determined robot waiting time, wherein the optimized production schedule only exists if the hybrid multi-cluster tool is process-dominant where the robot activity time of the plurality of single-arm tools and dual-arm tools is substantially shorter than processing time at the processing module; determining the optimized production schedule if the optimized production schedule exists.

In one embodiment of the second aspect, the step of determining the time for individual operations of the robotic arm and the processing module in the plurality of single-arm tools and dual-arm tools comprises determining one or more of: a time required for the robotic arm of the single-arm tool to load or unload the object; a time required for the robotic arms of the dual-arm tool to swap; a time required for the robotic arm of the single-arm tool or the dual-arm tool to move while holding the object; a time required for the robotic arm of the single-arm tool to move without holding the object; a time required for processing the object in the processing module of the single-arm tool or the dual-arm tool; a time required for resting the object in the processing module of the single-arm tool or the dual-arm tool; a time required for the robotic arm of the single-arm tool to wait before unloading the object; a time required for the robotic arms of the dual-arm tool to wait at the processing module of the dual arm tool; and a time required for the robotic arms of the dual-arm tool to wait during swap at the processing module of the dual arm tool.

In one embodiment of the second aspect, the different connection relationships comprise: an upstream downstream relationship that includes an upstream single-arm tool and downstream single-arm tool connection, an upstream single-arm tool and a downstream-dual arm tool connection, an upstream dual-arm tool and a downstream single-arm tool connection, or an upstream dual-arm tool and a downstream dual-arm tool connection; and a number relationship that includes a number of adjacent single-arm or the dual-arm tools of which the respective single-arm tool or the dual-arm tool is connected to In one embodiment of the second aspect, the Petri-Net (PN) model computation module is arranged to determine whether the optimized production schedule exists using the time for individual operations and the waiting time by: calculating an activity time of each of the single-arm tools and dual-arm tools in a production cycle without robot waiting using the time for individual operations; calculating a fundamental period of each of the single-arm tools and dual-arm tools using the time for individual operations;

determining a maximum fundamental period from the calculated fundamental periods; determining the robot waiting time of each of the plurality of single-arm tools and dual-arm tools using the maximum fundamental period; evaluating the waiting time determined so as to determine if the optimized production schedule exists.

In one embodiment of the second aspect, the Petri-Net (PN) model computation module is arranged to determine the optimized production schedule by setting an optimal robot waiting time for each of the plurality of single-arm tools and dual-arm tools based on the determination results without interfering with the operation of the buffering modules.

In one embodiment of the second aspect, the hybrid multi-cluster tool has a non-cyclic treelike structure with at least one of the single-arm tools and dual-arm tools being connected with three or more adjacent single-arm tools and dual-arm tools.

In one embodiment of the second aspect, the optimized production schedule comprises a shortest time for completion of a cycle of production of the object.

In one embodiment of the second aspect, the object is a semiconductor and the production line is a semiconductor manufacturing line.

It is an object of the present invention to address the above needs, to overcome or substantially ameliorate the above disadvantages or, more generally, to provide a.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Multi-cluster tools generally comprise a number of single-cluster tools connected by buffering modules with a capacity of one or two, and they may have linear or non-cyclic treelike topology. A multi-cluster tool with K (≥2) individual cluster tools is generally referred to as a K-cluster tool. Furthermore, if these individual tools include both single and dual-arm tools, then the multi-cluster tool is of a hybrid type.

Figure 1:
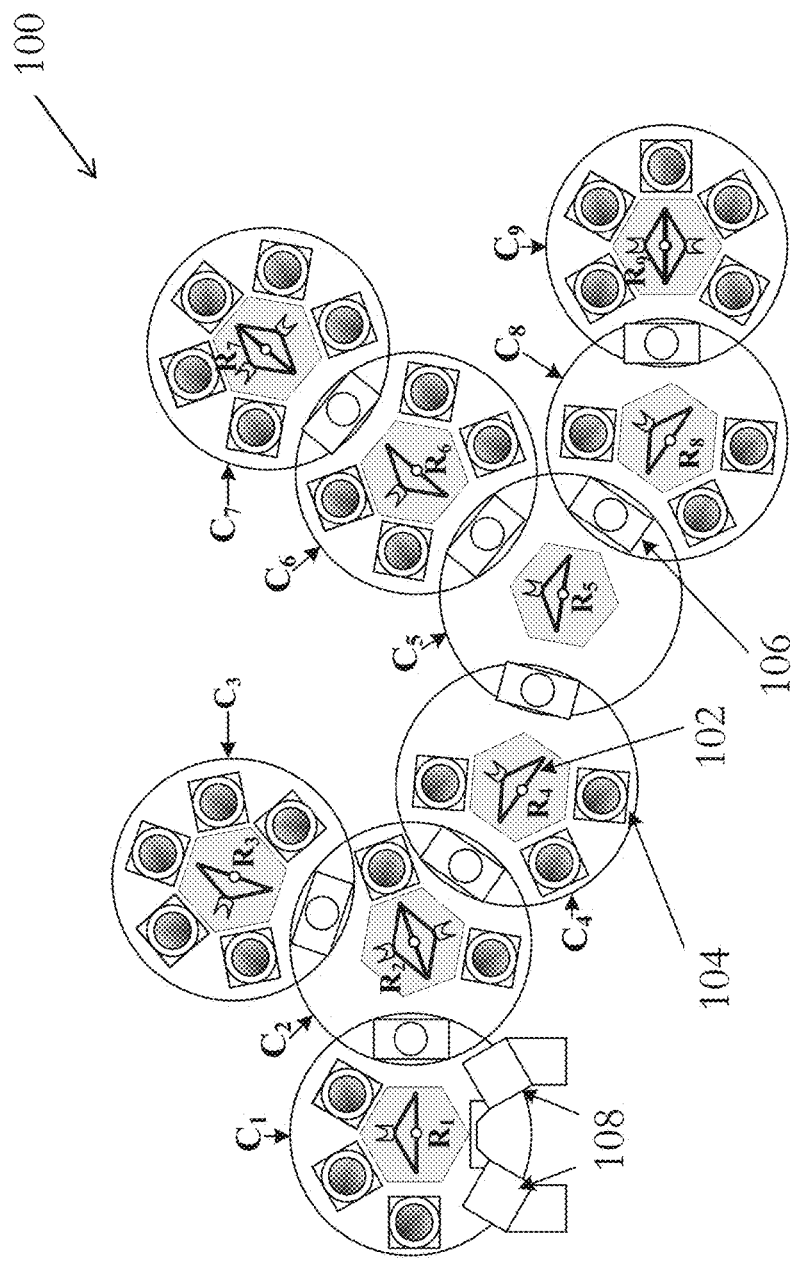
FIG. 1 shows a hybrid multi-cluster tool comprising 9 single-arm and dual-arm tools arranged in a tree-like structure in accordance with one embodiment of the present invention.

An exemplary treelike hybrid 9-cluster tool 100 linked by buffering modules 106 is illustrated in FIG. 1. As shown in FIG. 1, the exemplary 9-cluster tool 100 includes nine interconnected cluster tools $C_1$-$C_9$ each having a robotic arm $R_1$-$R_9$ (single-arm: $R_1$, $R_3$, $R_4$, $R_5$, $R_6$, $R_8$; dual-arm: $R_2$, $R_7$, $R_9$). Cluster tool $C_1$ includes a loadlock 108 with loading and unloading stations. All cluster tools except $C_5$ further includes a number of processing modules 104. All cluster tools are connected with each other through buffering modules 106. In the present embodiment and in the following discussion, $C_1$ with loadlocks 108 is called head tool, $C_i$, i≠1, is a leaf tool if it connects with only one adjacent tool, and $C_i$, i≠1 is a fork tool if it connects at least three adjacent tools.

In the present invention, a Petri net (PN) model has been developed for determining and evaluating an optimized schedule of a production line formed by a treelike hybrid multi-cluster tool, such as that shown in FIG. 1.

In one embodiment, the present invention provides a method for determining an optimized production schedule of a production line, the production line comprises a hybrid multi-cluster tool formed by a plurality of single-arm tools and dual-arm tools interconnected with each other; wherein each single-arm tool includes one robotic arm for manipulating an object and at least one processing module for processing the object or a buffering module for holding the object, and each dual-arm tool includes two robotic arms for manipulating an object and at least one processing module for processing the object or a buffering module for holding the object; the single-arm tools and dual-arm tools are connected with each other through at least one buffering module; the method comprising the steps of: determining time for individual operations of the robotic arm and the processing module in the plurality of single-arm tools and dual-arm tools; determining waiting time of the single-arm tools and dual-arm tools based on the time for individual operations and different connection relationships of the plurality of single-arm tools and dual-arm tools; determining whether the optimized production schedule exists using the determined waiting time, wherein the optimized production schedule only exists if the hybrid multi-cluster tool is process-dominant where the robot activity time of the plurality of single-arm tools and dual-arm tools is substantially shorter than processing time at the processing module; and determining the optimized production schedule if the optimized production schedule exists.

Petri Net (PN) Modeling

The following assumptions are made in the embodiment of the present invention:

1) a buffering module has no processing function and its capacity is one;
2) for each step, only one process module is configured for product (e.g., semiconductor wafer) processing and, only one product can be processed in a process module at a time;
3) only one type of product is processed with an identical recipe, and they visit a process module only once except entering a buffering module at least twice;
4) the robots' task time is constant; and
5) besides buffering module, there is at least one processing step in each individual tool except the fork and leaf tool.

The fork tool may have no processing step and the leaf tool has at least two process modules.

Let $\mathbb{N}_n=\{1, 2, \ldots, n\}$, $\Omega_n=\{0\}\cup\mathbb{N}_n$, and $C_i$ and $R_i$, i∈$\mathbb{N}_K$, denote the i-th cluster tool and its robot, respectively, where $C_1$ with load-locks is the head tool, $C_i$, i≠1 is the leaf tool if it connects with only one adjacent tool, and $C_i$, i≠1 is the fork tool if it connects at least three adjacent tools. Further, let L={i|$C_i$ is a leaf tool} be the index set of leaf tools. For the tool shown in FIG. 1, $C_3$, $C_7$, and $C_9$ are leaf tools, while $C_2$ and $C_5$ are fork tools. To simplify the presentation so as to clearly illustrate the invention, the tools are numbered such that for any two adjacent tools $C_k$ and $C_i$, k∉L and i∈$\mathbb{N}_K\setminus\{1\}$, with $C_k$/$C_i$ being the upstream/downstream one where i>k. It should be noted that, however, k and i are not necessary in a consecutive order as shown in FIG. 1. In one example, $PS_{10}$ is used to denote the loadlocks in $C_1$ and $PS_{ij}$ denote Step j (except the buffering modules) in $C_i$, i∈$\mathbb{N}_K$ and j∈$\mathbb{N}_r$.

A buffering module connecting $C_k$ and $C_i$ can be considered as the outgoing module for $C_k$ and the incoming module for $C_i$, respectively. Let n[i] represent the index for the last step in $C_i$, i∈$\mathbb{N}_K$. Then, the number of steps in $C_i$, including the incoming and outgoing steps, is n[i]+1. Further, let f[k] (1≤f[k]≤n[k]) denote the number of outgoing modules in $C_k$, k∉L, and these outgoing modules are denoted as $PS_{k(b[k]\_1)}$, $PS_{k(b[k]\_2)}$, ..., and $PS_{k(b[k]\_f[k])}$ with b[k]_1< b[k]_2< ... <b[k]_f[k]. When f[k]>1, $C_k$ is a fork tool, otherwise it is not. It should be pointed out that b[k]_1, b[k]_2, ... and b[k]_f[k] may not be in a consecutive order, in other words, b[k]_2=b[k]_1+1 may not hold. The incoming module for $C_i$ is denoted as $PS_{i0}$. In this way, the n[k]+1 steps in $C_k$ are denoted as $PS_{k0}$, $PS_{k1}$, ..., $PS_{k(b[k]\_1)}$, $PS_{k((b[k]\_1)+1)}$, ..., $PS_{k(b[k]\_2)}$, ..., $PS_{k(n[k])}$, respectively. Notice that b[k]_1 can be 1 if it is Step 1 and b[k]_f[k] can be n[k] if it is the last step. Hence, the route of a product in FIG. 1 is denoted as: $PS_{10}\to PS_{11}\to \ldots \to PS_{1(b[1]\_1)}$ $(PS_{20})\to PS_{2(b[2]\_1)}(PS_{30})\to PS_{31}\to \ldots \to PS_{30}$ $(PS_{2(b[2]\_1)})\to \ldots \to PS_{2(b[2]\_2)}(PS_{40})\to \ldots \to PS_{4(b[4]\_1)}$ $(PS_{50})\to \ldots \to PS_{50}$ $(PS_{4(b[4]\_1)})\to \ldots \to PS_{40}$ $(PS_{2(b[2]\_2)})\to \ldots \to PS_{20}$ $(PS_{1(b[1]\_1)})\to PS_{10}$.

A. Petri Net (PN) for Hybrid K-Cluster Tools

Figure 2:
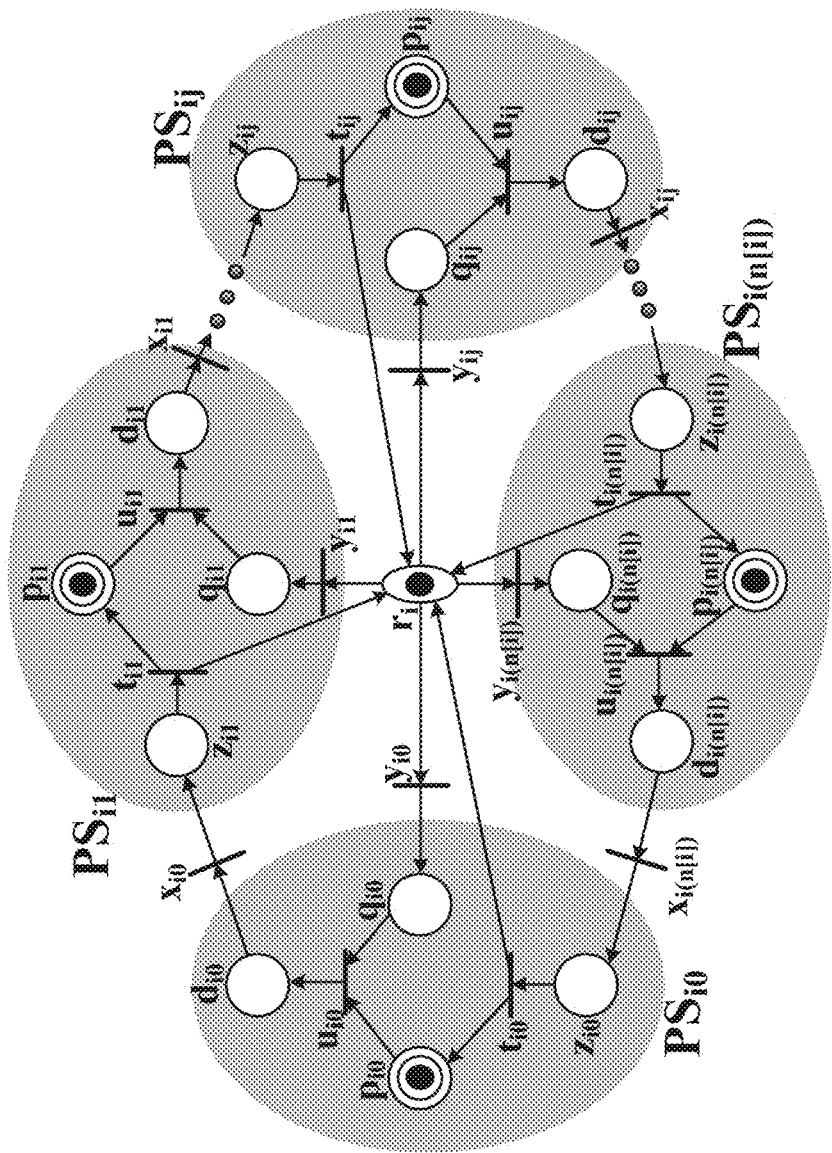
FIG. 2 is a Petri net (PN) model for a single-arm tool of FIG. 1.
Figure 3:
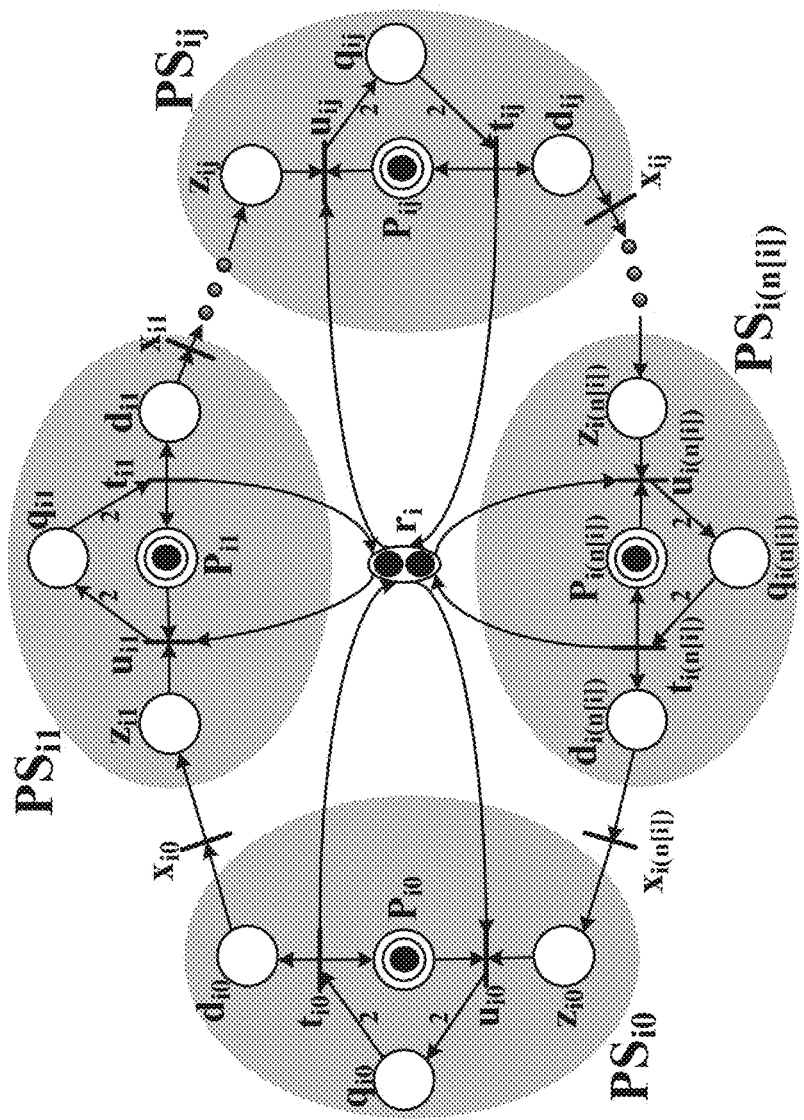
FIG. 3 is a Petri net (PN) model for a dual-arm tool of FIG. 1.

To model a hybrid K-cluster tool, the behavior of individual tools and buffering modules need to be modeled. Since the behavior of a single-arm tool is different from that of a dual-arm tool, their models are presented separately. FIGS. 2 and 3 illustrated a Petri net (PN) model for a single arm tool and a dual arm tool of FIG. 1 respectively. In the following discussion, a token and a product are used interchangeably.

For $C_i$, regardless of whether it is a single or dual-arm tool, places $r_i$ and $p_{ij}$ model $R_i$ and $PS_{ij}$, i∈$\mathbb{N}_K$, j∈$\Omega_{n[i]}$, respectively. For a single-arm tool $C_i$, as shown in FIG. 2, place $q_{ij}$ models $R_i$'s waiting before unloading a token (product) from $p_{ij}$, j∈$\Omega_{n[i]}$, $d_{ij}$ and $z_{ij}$ model $R_i$'s moving with a product held from Steps j to j+1 (or Step 0 if j=n[i]) and loading a product into $p_{ij}$, j∈$\Omega_{n[i]}$, respectively. Transitions $u_{ij}$ and $t_{ij}$ model $R_i$'s removing a product from $p_{ij}$ and dropping a product into $p_{ij}$, j∈$\Omega_{n[i]}$, respectively. Transition $x_{ij}$, j∈$\Omega_{n[i]}$, models $R_i$'s moving from Steps j to j+1 (or Step 0 if j=n[i]) with a product carried. Transition $y_{ij}$, j∈$\Omega_{n[i]}\setminus\{0, 1\}$, models $R_i$'s moving from Steps j+2 to j without carrying a product, or from Step 0 to n[i]−1 if j=0, or from Step 1 to n[i] if j=1.

For a dual-arm tool $C_i$, as shown in FIG. 3, place $q_{ij}$ models $R_i$'s waiting during swap at $p_{ij}$, j∈$\Omega_{n[i]}$, and $d_{ij}$ and $z_{ij}$ model the state that a swap ends and $R_i$'s waiting before unloading a product from $p_{ij}$, j∈$\Omega_{n[i]}$, respectively. Transitions $t_{ij}$ and $u_{ij}$ model $R_i$'s loading a product into $p_{ij}$ and unloading a product from $p_{ij}$, $j \in \Omega_{n[i]}$, respectively. By firing $u_{ij}$, two tokens go to $q_{ij}$, representing that both arms hold a product and wait. Transition $x_{ij}$, $j \in \Omega_{n[i]}$, models $R_i$'s moving from Steps j to j+1 (or Step 0 if j=n[i]) with a product carried.

Figures 4A, 4B, 4C, 4D:
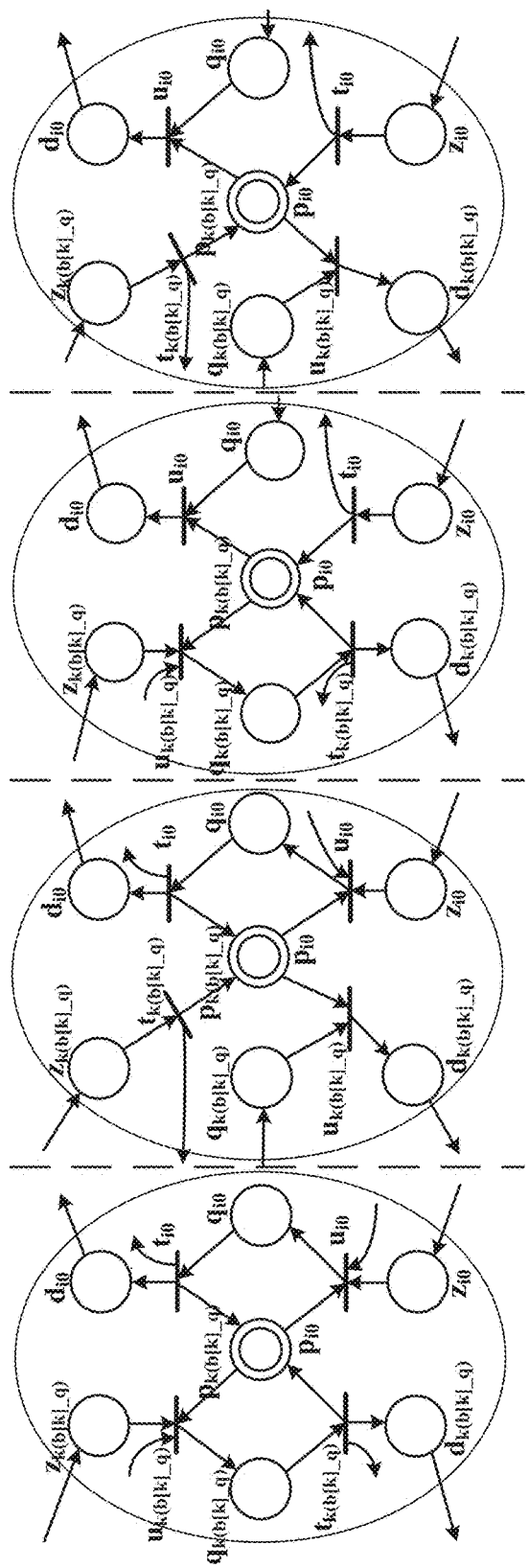
FIG. 4A is a Petri net (PN) model for a buffering module arranged between two dual-arm tools of FIG. 1.
FIG. 4B is a Petri net (PN) model for a buffering module arranged between an upstream single-arm tool and a downstream dual-arm tool of FIG. 1.
FIG. 4C is a Petri net (PN) model for a buffering module arranged between an upstream dual-arm tool and a downstream single-arm tool of FIG. 1.
FIG. 4D is a Petri net (PN) model for a buffering module arranged between two single-arm tools of FIG. 1.

For a buffering module that links $C_k$ and $C_i$, $k \notin L$, $i \in \mathbb{N}_K \backslash \{1\}$, with $C_i$ being the downstream one, there are four different cases: 1) both $C_k$ and $C_i$ are dual-arm tools (D-D); 2) $C_k$ and $C_i$ are single and dual-arm tools, respectively (S-D); 3) $C_k$ and $C_i$ are dual and single-arm tools, respectively (D-S); and 4) both $C_k$ and $C_i$ are single-arm tools (S-S). As discussed above, the buffering module connecting $C_k$ and $C_i$ can be denoted as $PS_{k(b[k]\_q)}$ for $C_k$, or the q-th OM, $1 \leq q \leq f[k]$, in $C_k$. This buffering module can be also denoted as $PS_{i0}$ in $C_i$. Then, it is modeled by $p_{k(b[k]\_q)}$ and $p_{i0}$ for $C_k$ and $C_i$, respectively, with $p_{k(b[k]\_q)} = p_{i0}$ and $K(p_{k(b[k]\_q)}) = K(p_{i0}) = 1$. The PN models of these four different cases are shown in FIG. 4. For the D-D case, Step b[k]_q for $C_k$ is modeled by $z_{k(b[k]\_q)}$, $u_{k(b[k]\_q)}$, $p_{k(b[k]\_q)}$, $q_{k(b[k]\_q)}$, $t_{k(b[k]\_q)}$, and $d_{k(b[k]\_q)}$ together with arcs $(z_{k(b[k]\_q)}, u_{k(b[k]\_q)})$, $(u_{k(b[k]\_q)}, q_{k(b[k]\_q)})$, $(q_{k(b[k]\_q)}, t_{k(b[k]\_q)})$, $t_{k(b[k]\_q)}$, $d_{k(b[k]\_q)}$), $(t_{k(b[k]\_q)}, p_{k(b[k]\_q)})$, and $(p_{k(b[k]\_q)}, u_{k(b[k]\_q)})$. Step 0 for $C_i$ is modeled by $z_{i0}$, $u_{i0}$, $q_{i0}$, $p_{i0}$, $t_{i0}$, and $d_{i0}$ together with arcs $(z_{i0}, u_{i0})$, $(u_{i0}, q_{i0})$, $(q_{i0}, t_{i0})$, $(t_{i0}, p_{i0})$, $(p_{i0}, u_{i0})$, and $(t_{i0}, d_{i0})$ as shown in FIG. 4A. Similarly, the models for S-D, D-S and S-S are obtained as shown in FIGS. 4B-4D respectively.

With the PN structure developed, by putting a V-token representing a virtual product (not real one), the initial marking $M_0$ of the PN model is set as follows.

If $C_1$ is a single-arm tool, set $M_0(r_1)=0$; $M_0(p_{10})=n$, representing that there are always products to be processed; $M_0(p_{1(b[1]\_1)})=0$ and $M_0(p_{1j})=1$, $j \in \mathbb{N}_{n[1]} \backslash \{b[1]\_1\}$; $M_0(z_{1j})=M_0(d_{1j})=0, j \in \Omega_{n[1]}$; $M_0(q_{1j})=0, j \in \Omega_{n[1]} \backslash \{(b[1]\_1)-1\}$; and $M_0(q_{1((b[1]\_1)-1)})=1$, meaning that $R_1$ is waiting at $PS_{1((b[1]\_1)-1)}$ for unloading a product there.

If $C_1$ is a dual-arm tool, set $M_0(r_1)=1$; $M_0(P_{10})=n$; $M_0(p_{1j})=1, j \in \mathbb{N}_{n[1]}$; $M_0(q_{1j})=M_0(d_{1j})=0, j \in \Omega_{n[1]}$; $M_0(z_{1j})=0, j \in \Omega_{n[i]} \backslash \{b[1]\_1\}$; and $M_0(z_{1(b[1]\_1)})=1$, meaning that $R_1$ is waiting at $PS_{1(b[1]\_1)}$ for unloading a product there. For $C_i$, $i \in \mathbb{N}_K \backslash \{1\}$, if it is a single-arm tool, set $M_0(r_i)=0$; $M_0(z_{ij})=M_0(d_{ij})=0, j \in \Omega_{n[i]}$; $M_0(p_{i1})=0$ and $M_0(p_{ij})=1$, $j \in \mathbb{N}_{n[i]} \backslash \{1\}$; $M_0(q_{ij})=0, j \in \mathbb{N}_{n[i]}$; and $M_0(q_{i0})=1$, implying that $R_i$ is waiting at $PS_{i0}$ for unloading a product there. If $C_i$, $i \in \mathbb{N}_K \backslash \{1\}$, is a dual-arm tool, set $M_0(r_i)=1$; $M_0(p_{ij})=1, j \in \mathbb{N}_{n[i]}$; $M_0(q_{ij})=M_0(d_{ij})=0, j \in \Omega_{n[i]}$; $M_0(z_{ij})=0, j \in \mathbb{N}_{n[i]}$; and $M_0(z_{i0})=1$, implying that $R_i$ is waiting at $PS_{i0}$ for unloading a product there. It should be pointed out that, for any adjacent $C_k$ and $C_i$, $k \in \mathbb{N}_{K-1}$, at $M_0$, it is assumed that the token in $p_{i0}$ enables $u_{k(b[k]\_q)}$, but not $u_{i0}$.

In FIGS. 4A-4D, both $u_{k(b[k]\_q)}$ and $u_{i0}$ are the output transitions of $p_{i0}$, leading to a conflict. Notice that a token entering $p_{i0}$ by firing $t_{k(b[k]\_q)}$ should enable $u_{i0}$, while the one entering $p_{i0}$ by firing $t_{i0}$ should enable $u_{k(b[k]\_q)}$. To distinguish such cases, colors have been introduced into the model to make it conflict-free.

Definition 2.1: Define the color of a transition $t_i$ as $C(t_i) = \{c_i\}$. From Definition 2.1, the colors for $u_{i0}$ and $u_{k(b[k]\_q)}$ are $c_{i0}$ and $c_{k(b[k]\_q)}$, respectively. Then, the color for a token can be defined as follows.

Let $\bullet t_i$ be the set of places of transition $t_i$. We present the following definition.

Definition 2.2: A token in $p \in \bullet t_i$ that enables $t_i$ has the same color of $t_i$'s, i.e., $\{c_i\}$. For example, a token that enters $p_{i0}$ by firing $t_{k(b[k]\_q)}$ has color $c_{i0}$, while the one that enters $p_{i0}$ by firing $t_{i0}$ has color $c_{k(b[k]\_q)}$. In this way, the PN is made conflict-free.

Based on the above discussion, the PN model for a dual-arm fork tool $C_i$ is deadlock-free but the PN model for a single-arm non-fork tool $C_i$ is deadlock-prone. To make the model deadlock-free, the following control policy is introduced.

Definition 2.3: For the PN model of a single-arm tool $C_i$, $i \in \mathbb{N}_K$, at marking M, transition $y_{ij}$, $j \in \Omega_{n[i]} \backslash \{n[i], (b[i]\_q)-1\}$, $q \in \mathbb{N}_{f[i]}$, is control-enabled if $M(p_{i(j+1)})=0$; $y_{i((b[i]\_q)-1)}$ is control-enabled if transition $t_{i((b[i]\_q)-1)}$ has just been executed; $y_{i(n[i])}$ is control-enabled if transition $t_{i1}$ has just been executed.

By using this control policy, the PN for a single-arm non-fork tool $C_i$ is deadlock-free. For a single-arm fork tool $C_i$, assume that, at M, $u_{i0}$ is enabled. After $u_{i0}$ fires, $R_i$ performs the following activities: $\mathbb{N} x_{i0} \to t_{i1} \to y_{i(n[i])} \to u_{i(n[i])} \to x_{i(n[i])} \to t_{i0} \to y_{i(n[i]-1)}(M(p_{i(n[i])})=0) \to \ldots \to y_{i((b[i]\_q)}$ $(M(p_{i((b[i]\_q)+1)})=0) \to u_{i((b[i]\_q)} \to x_{i((b[i]\_q)} \to t_{i((b[i]\_q)+1)} \to y_{i((b[i]\_q)-1)}) (t_{i((b[i]\_q)+1)}$ has just been executed)$\to \ldots y_{i0}(M(p_{i1})=0) \to u_{i0} \to x_{i0} \mathbb{N}$. In this way, a cycle is completed and this process can be repeated. Thus, there is no deadlock. This implies that, by the control policy, the PN for the system is made deadlock-free.

B. Modeling Activity Time

In the PN model developed above, with transitions and places representing activities that take time, time is associated with both transitions and places. Since the activity time taken by single-arm and dual-arm tool is different, it should be modeled for both tools. For both types of tools, the robot activity time is modeled such that the time for the robot to move from one step to another is same, so is the time for the robot to load/unload a product into/from a process module. In the present invention, the activity time is modeled as shown in Table I.

TABLE I

Time duration associated with transitions and places in $C_i$.

| Symbol | Transition or place | Action | Time duration | Tool type |
|---|---|---|---|---|
| $\lambda_i$ | $t_{ij}/u_{ij} \in T$ | $R_i$ loads/unloads a product into/from Step j, $j \in \Omega_{n[i]}$ | $\lambda_i$ | Single-arm |
| $\lambda_i$ | $u_{ij}$ and $t_{ij} \in T$ | $R_i$ Swaps at Step j, $j \in \Omega_{n[i]}$ | $\lambda_i$ | Dual-arm |
| $\mu_i$ | $x_{ij} \in T$ | $R_i$ moves from a step to another with a product hold | $\mu_i$ | Both |
| $\mu_i$ | $y_{ij} \in T$ | $R_i$ moves from a step to another without a product hold | $\mu_i$ | Single-arm |
| $\alpha_{ij}$ | $p_{ij} \in P$ | A product is being processed in $p_{ij}$, $j \in \Omega_{n[i]}$ | $\alpha_{ij}$ | Both |
| $\tau_{ij}$ | $p_{ij} \in P$ | A product is being processed and waiting in $p_{ij}$, $j \in \Omega_{n[i]}$ | $\geq \alpha_{ij}$ | Both |
| $\omega_{ij}$ | $q_{ij} \in P$ | $R_i$ waits before unloading a product from Step j, $j \in \Omega_{n[i]}$ | $[0, \infty)$ | Single-arm |
| $\omega_{ij}$ | $z_{ij} \in P$ | $R_i$ waits $p_{ij}$, $j \in \Omega_{n[i]}$ | $[0, \infty)$ | Dual-arm |
| $\omega_{ij1}$ | $q_{ij} \in P$ | $R_{ij}$ waits during swap at $p_{ij}$, $j \in \Omega_{n[i]}$ | 0 | Dual-arm |
| | $d_{ij} \in P$ | No robot activity is associated | 0 | Both |
| | $z_{ij} \in P$ | No robot activity is associated | 0 | Single-arm |

Timeliness Analysis of Individual Tools

With the PN model, the following presents the temporal properties of individual tools such that a schedule can be parameterized by robot waiting time. For a single-arm tool $C_i$, $i \in \mathbb{N}_K$, the time taken for processing a product at Step j, $j \in \mathbb{N}_{n[i]}$, is $$\theta_{ij} = \alpha_{ij} + 4\lambda_i + 3\mu_i + \omega_{i(j-1)}. \tag{3.1}$$

For Step 0, as $\alpha_{i0}=0$, $$\theta_{i0}=\alpha_{i0}+4\lambda_i+3\mu_i+\omega_{i(n[i])}=4\lambda_i+3\mu_i+\omega_{i(n[i])}. \quad (3.2)$$

With the robot waiting time being removed, the time taken for completing a product at Step $j$ is:

$$\xi_{ij}=\alpha_{ij}+4\lambda_i+3\mu_i, \; j\in\Omega_{n[i]}. \quad (3.3)$$

To make a schedule feasible, a product should stay at process module $PM_{ij}$ for $\tau_{ij}$ ($\geq\alpha_{ij}$) time units and, by replacing $\alpha_{ij}$ with $\tau_{ij}$, the cycle time at Step $j$ in $C_i$ is:

$$\pi_{ij}=\tau_{ij}+4\lambda_i+3\mu_i+\omega_{i(j-1)}, \; j\in\mathbb{N}_{n[i]}. \quad (3.4)$$

and $$\pi_{i0}=\tau_{i0}+4\lambda_i+3\mu_i+\omega_{i(n[i])}. \quad (3.5)$$

The robot cycle time for a single-arm tool $C_i$ is:

$$\psi_i=2(n[i]+1)(\lambda_i+\mu_i)+\Sigma_{j=0}^{n[i]}\omega_{ij}=\psi_{i1}+\psi_{i2}. \quad (3.6)$$

where $\psi_{i1}=2(n[i]+1)(\lambda_i+\mu_i)$ is the robot's activity time in a cycle without waiting and $\psi_{i2}=\Sigma_{j=0}^{n[i]}\omega_{ij}$ is the robot waiting time in a cycle.

For a dual-arm tool $C_i$, $i\in\mathbb{N}_K$, is the time needed for completing a product at Step $j$, $j\in\Omega_{n[i]}$, in $C_i$ is:

$$\xi_{ij}=\alpha_{ij}+\lambda_i. \quad (3.7)$$

Similarly, by replacing $\alpha_{ij}$ with $\tau_{ij}$ in (3.7), the cycle time at Step $j$, $j\in\Omega_{n[i]}$, in $C_i$ is:

$$\pi_{ij}=\tau_{ij}+\lambda_i. \quad (3.8)$$

The robot cycle time for a dual-arm tool $C_i$ is:

$$\psi_i=(n[i]+1)(\lambda_i+\mu_i)+\Sigma_{j=0}^{n[i]}\omega_{ij}=\psi_{i1}+\psi_{i2}. \quad (3.9)$$

where $\psi_{i1}=(n[i]+1)(\lambda_i+\mu_i)$ is the robot cycle time without waiting and $\psi_{i2}=\Sigma_{j=0}^{n[i]}\omega_{ij}$ is the robot's waiting time in a cycle.

As the manufacturing process in each $C_i$, $i\in\mathbb{N}_K$, is serial, in the steady state, the productivity for each step must be same. Thus, $C_i$ should be scheduled such that $$\pi_i=\pi_{i0}=\pi_{i1}=\ldots=\pi_{i(n[i])}=\psi_i. \quad (3.10)$$

Notice that both $\pi_i$ and $\psi_i$ are functions of $\omega_{ij}$'s, which means that the schedule for $C_i$, $i\in\mathbb{N}_K$, is parameterized by robots' waiting time. Based on the schedule for $C_i$, $i\in\mathbb{N}_K$, to schedule a treelike hybrid K-cluster tool, the key is to determine $\omega_{ij}$'s such that the activities of the multiple robots are coordinated to act in a paced way.

Scheduling the Overall System

A. Schedule Properties

Let $\Pi_i=\max\{\xi_{i0}, \xi_{i1}, \ldots, \xi_{i(n[i])}, \psi_{i1}\}$ be the fundamental period (FP) of $C_i$, $i\in\mathbb{N}_K$. If $\Pi_i=\max\{\xi_{i0}, \xi_{i1}, \ldots, \xi_{i(n[i])}\}$, $C_i$ is process-bound; otherwise it is transport-bound. Let $\Pi=\max\{\Pi_1, \Pi_2, \ldots, \Pi_K\}$ and assume that $\Pi=\Pi_h$, $1\leq h\leq K$, or $C_h$ is the bottleneck tool. As mentioned above, $C_h$ is process-bound in a process-dominant treelike hybrid K-cluster tool. Let $\Theta$ denote the cycle time for the system. With $\pi_i$ being the cycle time of $C_i$, to obtain a one-product cyclic schedule for a process-dominant treelike hybrid multi-cluster tool, every individual tool must have the same cycle time and it should be equal to the cycle time of the system, i.e., $$\Theta=\pi_i\geq\Pi, \; \forall i\in\mathbb{N}_K. \quad (4.1)$$

Based on (4.1), to find a one-product cyclic schedule is to schedule the individual tools such that they can act in a paced way. Since both $\pi_i$ and $\psi_i$ are functions of $\omega_{ij}$'s, given $\Theta(\geq\Pi)$ as cycle time, a one-product cyclic schedule can be obtained by determining $\omega_{ij}$'s for each tool $C_i$, $i\in\mathbb{N}_K$, $j\in\mathbb{N}_{n[i]}$. The individual tools are scheduled to be paced, if and only if for any adjacent pair $C_k$ and $C_i$, $k\notin L$, $i\notin\{1\}$, linked by $PS_{k(b[k]\_q)}$, $1\leq q\leq f[k]$, at any marking M: 1) whenever $R_i$ ($R_k$) is scheduled to load a product (token) into $p_{i0}$ ($p_{k(b[k]\_q)}$), $t_{i0}$ ($t_{k(b[k]\_q)}$) is enabled; and 2) whenever $R_i$ ($R_k$) is scheduled to unload a product (token) from $p_{i0}$ ($p_{k(b[k]\_q)}$), $\mu_{i0}$ ($\mu_{k(b[k]\_q)}$) is enabled. Given $\Theta=\Pi$, if a one-product cyclic schedule is found, the lower bound of cycle time is achieved.

B. Existence of a One-Product Cyclic Schedule with the Lower Bound of Cycle Time (OSLB)

For a process-dominant linear hybrid K-cluster tool, the conditions under which an OSLB exists are given as follows.

Lemma 4.1: For a process-dominant linear hybrid K-cluster tool, an OSLB exists, if and only if, for any adjacent tool pair $C_i$ and $C_{i+1}$, $i\in\mathbb{N}_{K-1}$, the following conditions are satisfied by determining $\omega_{ij}$'s and $\omega_{(i+1)l}$'s, $j\in\Omega_{n[i]}$ and $l\in\Omega_{n[i+1]}$.

$$\pi_{ij}=\pi_{(i+1)l}=\Pi, \; j\in\Omega_{n[i]} \text{ and } l\in\Omega_{n[i+1]}. \quad (4.2)$$

If $C_i$ and $C_{i+1}$ are D-S case $$\Pi-\lambda_i\geq 4\lambda_{i+1}+3\mu_{i+1}+\omega_{(i+1)(n[i+1])}. \quad (4.3)$$

If $C_i$ and $C_{i+1}$ are S-S case $$\Pi-(4\lambda_i+3\mu_i+\omega_{i(b[i]\_1)-1)})\geq 4\lambda_{i+1}+3\mu_{i+1}+\omega_{(i+1)(n[i+1])}. \quad (4.4)$$

Lemma 4.1 states that, to check the existence of an OSLB, one needs to examine the D-S and S-S cases only. By Lemma 4.1, given $\Theta=\Pi$, if conditions (4.2)-(4.4) are satisfied, a linear hybrid K-cluster tool can be scheduled such that the individual tools are paced. Notice that Condition (4.2) says that the cycle time of each individual tool is same, while Conditions (4.3) and (4.4) involve the operations of buffering modules only. Hence, although a treelike hybrid K-cluster tool is structurally different from a linear hybrid K-cluster tool, the similar conditions can be obtained for the existence of an OSLB. The following result are obtained.

Theorem 4.1: For a process-dominant treelike hybrid K-cluster tool, an OSLB exists, if and only if for any adjacent pair $C_k$ and $C_i$, $k\notin L$, $i\notin\{1\}$, linked by $PS_{k(b[k]\_q)}$, the following conditions are satisfied by determining $\omega_{kj}$'s and $\omega_{il}$'s, $j\in\Omega_{n[k]}$ and $l\in\Omega_{n[i]}$ such that $$\pi_{kj}=\pi_{il}=\Pi, \; j\in\Omega_{n[k]} \text{ and } l\in\Omega_{n[i]}. \quad (4.5)$$

If $C_k$ and $C_i$ are D-S case $$\Pi-\lambda_k\geq 4\lambda_i+3\mu_i+\omega_{i(n[i])}. \quad (4.6)$$

If $C_k$ and $C_i$ are S-S case $$\pi-(4\lambda_k+3\mu_k+\omega_{k(b[k]\_q)-1)})\geq 4\lambda_i+3\mu_i+\omega_{i(n[i])}. \quad (4.7)$$

Proof: With the fact that a linear hybrid K-cluster tool is a special case of a treelike hybrid K-cluster tool, it follows from Lemma 4.1 that Conditions (4.5)-(4.7) must be necessary. Thus, it is necessary to show the "if" part only. If a $C_k$ in a treelike hybrid K-cluster tool is not a fork, it acts just as an individual tool in a linear hybrid K-cluster tool. Thus, it is only necessary to examine the fork tools.

Assume that $C_k$ is a single-arm fork tool and $C_{k\_1}$, $C_{k\_2}, \ldots, C_{k\_f[k]}$ are the set of its adjacent downstream tools. Based on $M_0$, it can be assumed that the tool is at marking $M$ with $M(r_k)=0$; $M(z_{kj})=M(d_{kj})=0$, $j\in\Omega_{n[k]}$; $M(p_{k(b[k]\_1)})=0$ and $M(p_{kj})=1$, $j\in\mathbb{N}_{n[k]}\setminus\{b[k]\_1\}$; $M(q_{kj})=0, j\in\Omega_{n[k]}\setminus\{(b[k]\_1)-1\}$; and $M(q_{k((b[k]\_1)-1)})=1$, implying that $R_k$ is waiting at $PS_{k((b[k]\_1)-1)}$ for unloading a product there. Then, if (4.5) holds, the tool can be scheduled as follows. For $C_k$, $R_k$ unloads (firing $\mu_{k((b[k]\_1)-1)}$) a product from $PS_{k((b[k]\_1)-1)}$), and then moves ($x_{k((b[k]\_1)-1)}$) to $PS_{k(b[k]\_1)}$ and loads ($t_{k(b[k]\_1)}$) the product into it. After firing $t_{k(b[k]\_1)}$, $u_{(k\_1)0}$ fires immediately. Then, with a backward strategy, after some time, $R_k$ comes to $PS_{k((b[k]\_f[k])-1)}$ and $u_{k((b[k]\_f[k])-1)}$ fires to unload the product in $PS_{k((b[k]\_f[k])-1)}$. Then, $R_k$ moves ($x_{k((b[k]\_f[k])-1)}$ to $PS_{k(b[k]\_f[k])}$ and loads ($t_{k(b[k]\_f[k])}$) the product into it. After firing $t_{k(b[k]\_f[k])}$, $u_{k\_f[k])0}$ fires immediately. Similarly, the tool can be scheduled such that after firing $t_{k(b[k]\_q)}$, q=2, 3, . . . f[k]−1, ends, $u_{(k\_q)\,0}$ fires immediately. In this way, when $R_k$ comes to $q_{k(b[k]\_1)}$ again, if $C_{k\_1}$ is a single-arm tool and (4.7) is satisfied, $C_{k\_1}$ can be scheduled such that firing $t_{(k\_1)0}$ ends before $R_k$ comes to $q_{k(b[k]\_1)}$, or $u_{k(b[k]\_1)}$ is enabled when $R_k$ comes to $q_{k(b[k]\_1)}$. If $C_{k\_1}$ is a dual-arm tool, according to [Yang et al., 2014a], $C_{k\_1}$ can be scheduled such that when $R_k$ comes to $q_{k(b[k]\_1)}$, $u_{k(b[k]\_1)}$ is enabled. This implies that the interaction of $C_k$ and $C_{k\_1}$ does not affect the execution of the schedule for $C_k$. Similarly, if $C_{k\_q}$, q=2, 3, . . . , f[k], is a single-arm tool and (4.7) holds, it can be shown that the interaction of $C_k$ and $C_{k\_q}$ does not affect the execution of the schedule for $C_k$. Similarly, when $C_k$ is a dual-arm fork tool, for the D-S case, if (4.6) holds, the theorem holds.

Notice that the conditions given in Theorem 4.1 are the functions of robots' waiting time of single-arm tools and have nothing to do with dual-arm tools. Thus, to schedule a treelike hybrid K-cluster tool is to determine $\omega_{ij}$'s for single-arm tools $C_i$, $i \in \mathbb{N}_K$, $j \in \Omega_{n[i]}$, only. By this observation, for a dual-arm tool $C_i$, $i \in \mathbb{N}_K$, simply set $\omega_{i0}=\psi_{i2}=\Pi-\psi_{i1}$. Observe (4.6) and (4.7), it can be concluded that, for a single-arm tool $C_i$, $i \in \mathbb{N}_K$, to make the conditions given in Theorem 4.1 satisfied, it is necessary to set $\omega_{ij}$'s such that $\omega_{i(b[i]\_q)-1)}$, $q \in \mathbb{N}_{f[i]}$, and $\omega_{i(n[i])}$ are as small as possible. With this as a rule, the following discussion covers how to determine $\omega_{ij}$'s for the single-arm tools sequentially from the leaves to the head one to find an OSLB.

To ease the presentation, let h(z) be an arbitrary function and define $\Sigma_x^y h(z)=0$ if x>y. It follows from the discussion of the last section that, for a single-arm tool $C_i$, it is necessary to assign $R_i$'s idle time $\psi_{i2}=\Pi-2(n[i]+1)(\mu_i+\lambda_i)$ into $\omega_{ij}$'s. For a dual-arm tool $C_i$, $i \in L$, set $\omega_{ij}=0, j \in \mathbb{N}_{n[i]}$, and $\omega_{i0}=\psi_{i2}=\Pi-\psi_{i1}$. For a single-arm tool $C_i$, $i \in L$, set $\omega_{ij}=\min\{\Pi-(4\lambda_i+3\mu_i+\alpha_{i(j+1)}),\ \Pi-\psi_{i1}-\Sigma_{d=0}^{j-1}\omega_{id}\}$, $j \in \Omega_{n[i]-1}$ such that $\omega_{i(n[i])}=\Pi-\psi_{i1}-\Sigma_{j=0}^{n[i]-1}\omega_{ij}$ is minimized. Then, for the adjacent upstream tool $C_k$ of $C_i$ with $C_k$ and $C_i$ being linked by $PS_{k(b[k]\_q)}$, there are altogether four cases.

For Case 1), $C_k$ is a dual-arm non-fork tool, check if $\Pi-\lambda_k-4\lambda_i-3\mu_i-\omega_{i(n[i])} \geq 0$. If not, there is no OSLB, otherwise for $j \in \mathbb{N}_{n[k]}$, set $\omega_{kj}=0$ and $\omega_{k0}=\psi_{k2}=\Pi-\psi_{k1}$.

For Case 2), $C_k$ is a single-arm non-fork tool, check if $\Pi-(4\lambda_k+3\mu_k)-(4\lambda_i+3\mu_i+\omega_{i(n[i])}) \geq 0$. If not, there is no OSLB, otherwise set $\omega_{k[(b[k]\_1)-1]}=\min\{\Pi-(4\lambda_k+3\mu_k)-(4\lambda_i+3\mu_i+\omega_{i(n[i])}),\ \Pi-\psi_{k1}\}$, $\psi_{kj}=\min\{\Pi-(4\lambda_k+3\mu_k+\alpha_{k(j+1)}),\ \Pi-\psi_{k1}-\omega_{k((b[k]\_1)-1)}-\Sigma_{d=0}^{j-1}\omega_{kd}\ (d \neq (b[k]\_1)-1)\}$, $j \in \Omega_{n[k]} \setminus \{n[k], (b[k]\_1)-1\}$, and $\omega_{k(n[k])}=\Pi-\psi_{k1}-\omega_{k((b[k]\_1)-1)}-\Sigma_{j=0}^{n[k]-1}\omega_{kj}\ (j \neq (b[k]\_1)-1)$.

For Case 3), $C_k$ is a single-arm fork tool, check if $\Pi-(4\lambda_k+3\mu_k)-(4\lambda_i+3\mu_i+\omega_{i(n[i])}) \geq 0$. If not, there is no OSLB, otherwise set $\omega_{k((b[k]\_q)-1)}=\min\{\Pi-(4\lambda_k+3\mu_k)-(4\lambda_i+3\mu_i+\omega_{i(n[i])}),\ \Pi-\psi_{k1}-\Sigma_{d=1}^{q-1}\omega_{k((b[k]\_d)-1)}\}$, $\omega_{kj}=\min\{\Pi-(4\lambda_k+3\mu_k+\alpha_{k(j+1)}),\ \Pi-\psi_{k1}-\Sigma_{d=1}^{f[k]}\omega_{k((b[k]\_d)-1)}-\Sigma_{n=0}^{j-1}\omega_{kn}\ (n \notin \{(b[k]\_h)-1 | h \in \mathbb{N}_{f[k]}\})\}$, $j \in \Omega_{n[k]} \setminus \{n[k]\} \setminus \{(b[k]\_h)-1 | h \in \mathbb{N}_{f[k]}\}$, and $\omega_{k(n[k])}=\Pi-\psi_{k1}-\Sigma_{d=1}^{f(k)}\omega_{k((b[k]\_d)-1)}-\Sigma_{j=0}^{n[k]-1}\omega_{kj}\ (j \notin \{(b[k]\_h)-1 | h \in \mathbb{N}_{f[k]}\})$.

For Case 4), $C_k$ is a dual-arm fork tool, check if $\Pi-\lambda_k-4\lambda_i-3\mu_i-\omega_{i(n[i])} \geq 0$. If not, there is no OSLB, otherwise set $\omega_{kj}=0$, $j \in \mathbb{N}_{n[k]}$, and $\omega_{k0}=\psi_{k2}=\Pi-\psi_{k1}$.

Then, do the same for the adjacent upstream tool of $C_k$ and this process is repeated till $C_1$ such that an OSLB is obtained if it exists, or the process terminates at a $C_k$ with no such a schedule. Based on the above discussion, let Q be a binary variable indicating the existence of an OSLB. Then, the present invention utilises the following algorithm to test the existence of an OSLB and find it if it exists.

Algorithm 4.1: Test the existence of an OSLB for a treelike hybrid K-cluster tool Step 1: Initialization: Q=1, calculate $\psi_{i1}$ and $\Pi_i$, $i \in \mathbb{N}_K$, and $\Pi=\max\{\Pi_1, \Pi_2, \ldots, \Pi_K\}$.

Step 2: When $i \in L$:

2.1. If $C_i$ is a single-arm tool 2.2.1. $\omega_{ij}=\min\{\Pi-(4\lambda_i+3\mu_i+\alpha_{i(j+1)}),\ \Pi-\psi_{i1}-\Sigma_{d=0}^{j-1}\omega_{id}\}$, $j \in \Omega_{n[i]-1}$, and $\omega_{i(n[i])}=\Pi-\psi_{i1}-\Sigma_{j=0}^{n[i]-1}\omega_{ij}$;

2.2.2. For its adjacent upstream tool $C_k$, if it is a fork tool, go to Step 7;

2.2.3. Otherwise if it is a single-arm tool, go to Step 3, and if it is a dual-arm tool, Step 4;

2.2. If $C_i$ is a dual-arm tool 2.2.4. $\omega_{ij}=0$, $\omega_{i0}=\psi_{i2}=\Pi-\psi_{i1}$, $j \in \mathbb{N}_{n[i]}$;

2.2.5. For its adjacent upstream tool $C_k$, if it is a fork tool, go to Step 7;

2.2.6. Otherwise if it is a single-arm tool, go to Step 6, and if it is a dual-arm tool, Step 5;

Step 3: Determine $\omega_{kj}$ for $R_k$ if $C_k$ and $C_i$ are S-S.

3.1. If $\Pi-(4\lambda_k+3\mu_k)-(4\lambda_i+3\mu_i+\omega_{i(n[i])})<0$, Q=0 and go to Step 8;

3.2. Else, $\omega_{k((b[k]\_1)-1)}=\min\{\Pi-(4\lambda_k+3\mu_k)-(4\lambda_i+3\mu_i+\omega_{i(n[i])}),\ \Pi-\psi_{k1}\}$;

3.3 $\omega_{kj}=\min\{\Pi-(4\lambda_k+3\mu_k+\alpha_{k(j+1)}),\ \Pi-\psi_{k1}-\omega_{k((b[k]\_1)-1)}-\Sigma_{d=0}^{j-1}\omega_{kd}(d \neq (b[k]\_1)-1)\}$, $j \in \Omega_{n[k]} \setminus \{n[k], (b[k]\_1)-1\}$;

3.4. $\omega_{k(n[k])}=\Pi-\psi_{k1}-\omega_{k((b[k]\_1)-1)}-\Sigma_{j=0}^{n[k]-1}\omega_{kj}\ (j \neq (b[k]\_1)-1)$;

3.5. i=k with $C_k$ being its adjacent upstream tool. If k=0 go to Step 8, else if $C_k$ is a fork tool, go to Step 7; otherwise if it is a single-arm tool, go to Step 3.1, and if it is a dual-arm, go to Step 4;

Step 4: Determine $\omega_{kj}$ for $R_k$ if $C_k$ and $C_i$ are D-S.

4.1. If $\Pi-\lambda_k-(4\lambda_i+3\mu_i+\omega_{i(n[i])})<0$, let Q=0 and go to Step 8;

4.2. Else, $\omega_{kj}=0$ and $\omega_{k0}=\psi_{k2}=\Pi-\psi_{k1}$, $j \in \mathbb{N}_{n[k]}$;

4.3. i=k with $C_k$ being its adjacent upstream tool. If k=0 go to Step 8, else if $C_k$ is a fork tool, go to Step 7; otherwise, if it is a single-arm tool go to Step 6, and if it is a dual-arm one go to Step 5;

Step 5: Determine $\omega_{kj}$ for $R_k$ if $C_k$ and $C_i$ are D-D.

5.1. $\omega_{kj}=0$ and $\omega_{k0}=\psi_{k2}=\Pi-\psi_{k1}$, $j \in \mathbb{N}_{n[k]}$;

5.2. i=k with $C_i$ being its adjacent upstream tool. If k=0 go to Step 8, else if $C_k$ is a fork tool go to Step 7; otherwise, if it is a single-arm tool go to Step 6, and if it is a dual-arm one go to Step 5.1;

Step 6: Determine $\omega_{kj}$ for $R_k$ if $C_k$ and $C_i$ are S-D.

6.1. $\omega_{k[(b[k]\_1)-1]}=\min\{\Pi-(4\lambda_k+3\mu_k)-\lambda_i,\ \Pi-\psi_{k1}\}$;

6.2. $\omega_{kj}=\min\{\Pi-(4\lambda_k+3\mu_k+\alpha_{k(j+1)}),\ \Pi-\psi_{k1}-\omega_{k((b[k]\_1)-1)}-\Sigma_{d=0}^{j-1}\omega_{kd}\ (d \neq (b[k]\_1)-1)\}$, $j \in \Omega_{n[k]} \setminus \{n[k], (b[k]\_1)-1\}$;

6.3. $\omega_{k(n[k])}=\Pi-\psi_{k1}-\omega_{k((b[k]\_1)-1)}-\Sigma_{j=0}^{n[k]-1}\omega_{kj}\ (j \neq (b[k]\_1)-1)$;

6.4. i=k with $C_k$ being its adjacent upstream tool. If k=0 go to Step 8, else if $C_k$ is a fork tool go to Step 7; otherwise, if it is a single-arm tool go to Step 3, and if it is a dual-arm one go to Step 4;

Step 7: Determine $\omega_{kj}$ for $R_k$ if $C_k$ is a fork tool.

7.1. If $C_k$ is a single-arm fork tool 7.1.1. For $C_k$ and $C_i$, when it is S-S, if $\Pi-(4\lambda_k+3\mu_k)-(4\lambda_i+3\mu_i+\omega_{i(n[i])})<0$, let Q=0 and go to Step 8; otherwise, $\omega_{k[(b[k]\_q)-1]}=\min\{\Pi-(4\lambda_k+3\lambda_k)-(4\lambda_i+3\mu_i+\omega_{i(n[i])}),\ \Pi-\psi_{k1}-\Sigma_{d=1}^{q-1}\omega_{k((b[k]\_d)-1)})\}$. When it is S-D case, $\omega_{k((b[k]\_q)-1)}=\min\{\Pi-(4\lambda k+3\mu_k)-\lambda_i,\ \Pi-\psi_{k1}-\Sigma_{d=1}^{q-1}\omega_{k((b[k]\_1)-1)}\}$;

7.1.2. $\omega_{kj}=\min\{\Pi-(4\lambda_k+3\mu_k+\alpha_{k(j-1)}), \Pi-\psi_{k1}-\Sigma_{d=1}^{f[k]}\omega_{k((b[k]\_d)-1)}-\Sigma_{n=0}^{j-1}\omega_{kn}(n\notin\{(b[k]\_h)-1|h\in\mathbb{N}_{f[k]}\})\}, j\in\Omega_{n[k]}\backslash\{n[k]\}\backslash\{(b[k]\_h)-1|h\in\mathbb{N}_{f[k]}\};$ 7.1.3. $\omega_{k(n[k])}\Pi-\psi_{k1}-\Sigma_{d=1}^{f[k]}\omega_{k((b[k]\_d)-1)}-\Sigma_{j=0}^{n[k]-1}\omega_{kj}$ $(j\notin\{(b[k]\_h)-1|h\in\mathbb{N}_{f[k]}\});$ 7.1.4. i=k with $C_k$ being its adjacent upstream tool. If k=0 go to Step 8, else if $C_k$ is a fork tool, go back to Step 7; otherwise, if it is a single-arm tool go to Step 3, and if it is a dual-arm one go to Step 4;

7.2. If $C_k$ is a dual-arm fork tool 7.2.1. For $C_k$ and $C_i$, when it is D-S case, if $\Pi-\lambda_k-(4\lambda_i+3\mu_i+\omega_{i(n[i])})<0$, let Q=0 and go to Step 8, otherwise, $\omega_{kj}=0$ and $\omega_{k0}=\psi_{k2}=\Pi-\psi_{k1}, j\in\mathbb{N}_{n[k]};$ 7.2.2. When it is D-D case, $\omega_{kj}=0$ and $\omega_{k0}=\psi_{k2}=\Pi-\psi_{k1}, j\in\mathbb{N}_{n[k]};$ 7.2.3. i=k with $C_k$ being its adjacent upstream cluster. If k=0 go to Step 8, else if $C_k$ is a fork tool, go back to Step 7; otherwise, if it is a dual-arm tool go to Step 5, and if it is a single-arm tool, go to Step 6.

Step 8: End and return Q.

Using Algorithm 4.1, if Q=1 is returned, an OSLB is found for a process-dominant treelike hybrid K-cluster tool, otherwise there is no such a schedule. Based on Algorithm 4.1, to check if LB of cycle time can be achieved for a treelike hybrid K-cluster tool, it is necessary to set the robot waiting time from the leaf to the head one by one. In the worst case when Q=1 is returned, it is only necessary to set the robot waiting time for each individual tool once and check condition 4.6 or 4.7 for each buffering module once. Let H=max(n[1]+1, n[2]+1, ..., n[K]+1). Since it is necessary need to set $\omega_{ij}$ for each Step j in $C_i$, $i\in\mathbb{N}_K$, $j\in\Omega_{n[i]}$, there are at most H×K operations in setting the robot waiting time. Meanwhile, there are K−1 buffering modules for checking Condition 4.6 or 4.7. Hence, there are at most (H+1)×K−1 operations altogether. With H and K being bounded to known constants, the computational complexity of Algorithm 4.1 is bounded by a constant and thus it is very efficient.

EXAMPLE 1

Example 1 is a treelike hybrid 3-cluster tool, where dual-arm tool $C_1$ is a fork tool and its adjacent downstream tools are single-arm tools $C_2$ and $C_3$. In this example, their activity time is as follows. For $C_1$, $(\alpha_{10}, \alpha_{11}, \alpha_{12}, \alpha_{13}, \lambda_1, \mu_1)=(0, 77, 0, 0, 13, 1)$; for $C_2$, $(\alpha_{20}, \alpha_{21}, \alpha_{22}, \lambda_2, \mu_2)=(0, 65, 69, 4, 1)$; for $C_3$, $(\alpha_{30}, \alpha_{31}, \alpha_{32}, \lambda_3, \mu_3)=(0, 61, 55, 6, 1)$.

For $C_1$, $\xi_{10}=13$ s, $\xi_{11}=90$ s, $\xi_{12}=13$ s, $\xi_{13}=13$ s, $\psi_{11}=(n[1]+1)\times(\lambda_1+\mu_1)=4\times14=56$ s, $\Pi_1=90$ s and it is process-bound. For $C_2$, $\xi_{20}=19$ s, $\xi_{21}=84$ s, $\xi_{22}=88$ s, $\psi_{21}=2(n[2]+1)\times(\lambda_2+\mu_2)=6\times5=30$ s and $\Pi_2=88$ s. For $C_3$, $\xi_{30}=27$ s, $\xi_{31}=88$ s, $\xi_{32}=82$ s, $\psi_{31}=2(n[3]+1)\times(\lambda_3+\mu_3)=6\times7=42$ s and $\Pi_3=88$ s. This 3-cluster tool is process-dominant with $\Pi_1>\Pi_2=\Pi_3$ and let $\Pi=\Pi_1=\pi_1=\pi_2=\pi_3=90$ s. By Algorithm 4.1, the robots' waiting time is set as $\omega_{20}=6$ s, $\omega_{21}=2$ s, and $\omega_{22}=\Pi-\psi_{21}-\omega_{20}-\omega_{21}=90-30-6-2=52$ s; $\omega_{30}=2$ s, $\omega_{31}=8$ s, and $\omega_{32}=\Pi-\psi_{31}-\omega_{30}-\omega_{31}=90-42-2-8=38$ s. Then, for $C_1$, as $\Pi-(4\lambda_2+3\mu_2+\omega_{22})-\lambda_1=90-(19+52)-13=6>0$ and, $\Pi-(4\lambda_3+3\mu_3+\omega_{32})-\lambda_1=90-(27+38)-13=12>0$, from Algorithm 4.1, a cyclic schedule with lower bound of cycle time can be obtained by setting $\omega_{10}=34$ s, $\omega_{11}=\omega_{12}=\omega_{13}=0$. Simulation is used to verify the correctness of the schedule as shown in Table II.

Figure 5:
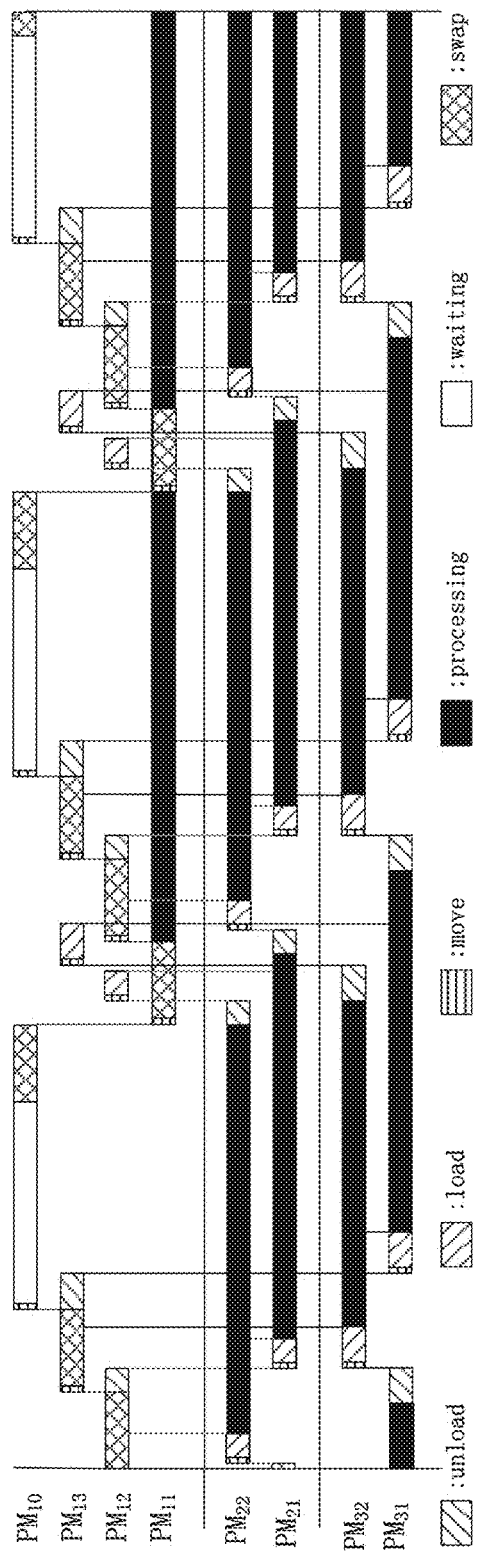
FIG. 5 shows a Gantt chart of an operation schedule of Example 1 in accordance with one embodiment of the present invention.

From Table II, it can be seen that, by firing $u_{20}$ immediately after $R_1$'s swap operation at $p_{12}$, when $R_2$ ($R_1$) is scheduled to unload a product from $p_{20}(p_{12})$, $M(p_{20})=1(M(p_{12})=1)$; when $R_2(R_1)$ is scheduled to load a product into $p_{20}(p_{12})$, $M(p_{20})=0(M(p_{12})=0)$. Similarly, $R_3(R_1)$ can act as scheduled without being delayed by a buffering module if $u_{30}$ fire immediately after $R_1$'s swap operation at $p_{13}$. The Gantt chart for the schedule obtained is shown in FIG. 5. It shows that the schedule obtained is a one-product cyclic one with its cycle time being the lower bound.

TABLE II

The simulation result for example 1.

| | $C_1$ | | | $C_2$ | | | $C_3$ | |
|---|---|---|---|---|---|---|---|---|
| NO. | Time interval(s) | Robot action | NO. | Time interval(s) | Robot action | NO. | Time interval(s) | Robot action |
| 1 | 0–13 | Swap at $p_{12}$ | 1 | 13–17 | Unload from $p_{20}$ | 1 | 27–33 | Unload from $p_{30}$ |
| 2 | 13–14 | Move to $p_{13}$ | 2 | 17–18 | Move to $p_{21}$ | 2 | 33–34 | Move to $p_{31}$ |
| 3 | 14–27 | Swap at $p_{13}$ | 3 | 18–22 | Load into $p_{23}$ | 3 | 34–40 | Load into $p_{31}$ |
| 4 | 27–28 | Move to $p_{10}$ | 4 | 22–23 | Move to $p_{22}$ | 4 | 40–41 | Move to $p_{32}$ |
| 5 | 28–62 | Wait at $p_{10}$ | 5 | 23–75 | Wait at $p_{22}$ | 5 | 41–79 | Wait at $p_{32}$ |
| 6 | 62–75 | Swap at $p_{10}$ | 6 | 75–79 | Unload from $p_{22}$ | 6 | 79–85 | Unload from $p_{32}$ |
| 7 | 75–76 | Move to $p_{11}$ | 7 | 79–80 | Move to $p_{20}$ | 7 | 85–86 | Move to $p_{30}$ |
| 8 | 76–89 | Swap at $p_{11}$ | 8 | 80–84 | Load into $p_{20}$ | 8 | 86–92 | Load into $p_{30}$ |
| 9(Π) | 89–90 | Move to $p_{12}$ | 9 | 84–85 | Move to $p_{21}$ | 9 | 92–93 | Move to $p_{31}$ |
| 10 | 90–103 | Swap at $p_{12}$ | 10 | 85–87 | Wait at $p_{21}$ | 10 | 93–101 | Wait at $p_{31}$ |
| 11 | 103–104 | Move to $p_{13}$ | 11 | 87–91 | Unload from $p_{21}$ | 11 | 101–107 | Unload from $p_{31}$ |
| 12 | 104–117 | Swap at $p_{13}$ | 12 | 91–92 | Move to $p_{22}$ | 12 | 107–108 | Move to $p_{32}$ |
| 13 | 117–118 | Move to $p_{10}$ | 13 | 92–96 | Load into $p_{22}$ | 13 | 108–114 | Load into $p_{32}$ |

TABLE II-continued

The simulation result for example 1.

| | $C_1$ | | | $C_2$ | | | $C_3$ | |
|---|---|---|---|---|---|---|---|---|
| NO. | Time interval(s) | Robot action | NO. | Time interval(s) | Robot action | NO. | Time interval(s) | Robot action |
| 14 | 118-152 | Wait at $p_{10}$ | 14 | 96-97 | Move to $p_{20}$ | 14 | 114-115 | Move to $p_{30}$ |
| 15 | 152-165 | Swap at $p_{10}$ | 15(II) | 97-103 | Wait at $p_{20}$ | 15(II) | 115-117 | Wait at $p_{30}$ |

EXAMPLE 2

Example 2 is a treelike hybrid 5-cluster tool, where $C_2$ is a fork tool and its adjacent tools are $C_1$, $C_3$ and $C_5$. $C_5$ and $C_4$ that is adjacent to $C_3$ are leaf tools. Furthermore, $C_1$ is a dual-arm tool and the others are all single-arm tools. Their activity time is as follows: for $C_1$, $(\alpha_{10}, \alpha_{11}, \lambda_1, \mu_1)=(0, 61.5, 0, 28.5, 0.5)$; for $C_2$, $(\alpha_{20}, \alpha_{21}, \alpha_{22}, \lambda_2, \mu_2)=(0, 0, 0, 10, 1)$; for $C_3$, $(\alpha_{30}, \alpha_{31}, \alpha_{32}, \alpha_{33}, \lambda_3, \mu_3)=(0, 56, 0, 58, 7, 1)$; for $C_4$, $(\alpha_{40}, \alpha_{41}, \alpha_{42}, \alpha_{43}, \lambda_4, \mu_4)=(0, 56, 66, 65, 5, 1)$; and for $C_5$, $(\alpha_{50}, \alpha_{51}, \alpha_{52}, \lambda_5, \mu_5)=(0, 48, 50, 6, 1)$.

For $C_1$, $\xi_{10}=28.5$ s, $\xi_{11}=90$ s, $\xi_{12}=28.5$ s, $\psi_{11}$, $\psi_{11}=(n[1]+1)\times(\lambda_1+\mu_1)=3\times29=87$ s, $\Pi_1=90$ s, and it is process-bound. For $C_2$, $\xi_{20}=43$ s, $\mu_{21}=43$ s, $\xi_{22}=43$ s, $\psi_{21}=2(n[2]+1)\times(\lambda_2+\mu_2)=2\times3\times11=66$ s, and $\Pi_2=66$ s. For $C_3$, $\xi_{30}=31$ s, $\xi_{31}=87$ s, $\xi_{32}=31$ s, $\xi_{33}=89$ s, $\psi_{31}=2(n[3]+1)\times(\lambda_3+\mu_3)=2\times4\times8=64$ s, and $\Pi_3=89$ s. For $C_4$, $\xi_{40}=23$ s, $\xi_{41}=79$ s, $\xi_{42}=89$ s, $\xi_{43}=88$ s, $\psi_{41}=2(n[4]+1)\times(\lambda_4+\mu_4)=2\times4\times6=48$ s, and $\Pi_4=89$ s. For $C_5$, $\xi_{50}=27$ s, $\xi_{51}=75$ s, $\xi_{52}=77$ s, $\psi_{51}=2(n[5]+1)\times(\lambda_5+\mu_5)=2\times3\times7=42$ s, and $\Pi_5=77$ s. This is shown that it is process-dominant with $\Pi=\Pi_1=90$ s. Next, let $\Pi=\pi_1=\pi_2=\pi_3=\pi_4=\pi_5=90$ s.

By Algorithm 4.1, for $C_4$, $\omega_{40}=11$ s, $\omega_{41}=1$ s, $\omega_{42}=2$ s, and $\omega_{43}=\Pi-\psi_{41}-\omega_{40}-\omega_{41}-\psi_{42}=90-48-11-1-2=28$ s. For $C_5$, $\psi_{50}=15$ s, $\omega_{51}=13$ s, and $\omega_{52}=\Pi-\omega_{51}-\omega_{50}-\omega_{51}=90-42-15-13=20$ s. For $C_3$, since $\Pi-(4\lambda_4+3\mu_4+\omega_{43})-(4\lambda_3+3\mu_3)=90-(23+28)-31=8>0$, set $\omega_{31}=\min\{8,\Pi-\psi_{31}\}=\min\{8,26\}=8$ s, $\omega_{30}=\min\{90-\xi_{31},\Pi-\psi_{31}-\omega_{31}\}=\min\{3,26-8\}=3$ s, $\omega_{32}=\min\{90-\xi_{33},\Pi-\psi_{31}-\omega_{31}-\omega_{30}\}=\min\{1,26-8-3\}=1$ s, and $\omega_{33}=\Pi-\psi_{31}-\omega_{30}-\omega_{32}=26-8-3-1=14$ s. For $C_2$, $\Pi-(4\lambda_3+\mu_3+\omega_{33})-(4\lambda_2+3\mu_2)=90-(31+14)-43=2>0$, set $\omega_{20}=\min\{2,\Pi-\psi_{21}\}=\min\{2,24\}=2$ s. With $\Pi-(4\lambda_5+3\mu_5+\omega_{52})-(4\lambda_2+3\mu_2)=90-(27+20)-43=0$, set $\omega_{21}=\min\{0,\Pi-\psi_{21}-\omega_{20}\}=\min\{0,22\}=0$. At last, set $\omega_{22}=\Pi-\psi_{21}-\omega_{20}-\omega_{21}=24-2-0=22$ s. For $C_1$ and $C_2$, since $\Pi-(4\lambda_2+3\mu_2+\omega_{22})-\lambda_1=90-(43+22)-28.5=-3.5<0$, or condition (4.6) is violated, i.e., there is no one-product cyclic schedule to achieve its lower bound and this result can also be verified by simulation.

The embodiments of the present invention are particularly advantageous as it provides a solution for scheduling a treelike multi-cluster tool with a complex topology which is process-bound. By developing a Petri net model to describe the system based mainly on the buffering modules, the necessary and sufficient conditions under which a one-wafer cyclic schedule with the lower bound of cycle time can be found. The present invention also proposes an efficient algorithm to test whether such a schedule exists and to find it if it exists.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for determining an optimized production schedule of a production line including a hybrid multi-cluster tool formed by a plurality of single-arm tools and dual-arm tools interconnected with each other; wherein each single-arm tool includes one robotic arm for manipulating an object and at least one processing module for processing the object or a buffering module for holding the object, and each dual-arm tool includes two robotic arms for manipulating an object and at least one processing module for processing the object or a buffering module for holding the object; each single-arm tool and dual arm tool are connected with each other through at least one buffering module;

the method comprising the steps of:
 determining time for individual operations of the robotic arm and the processing module in the plurality of single-arm tools and dual-arm tools;
 determining waiting time of the single-arm tools and dual-arm tools based on the time for individual operations and different connection relationships of the plurality of single-arm tools and dual-arm tools;
 determining whether the optimized production schedule exists using the determined waiting time, wherein the optimized production schedule only exists if the hybrid multi-cluster tool is process-dominant where the robot activity time of the plurality of single-arm tools and dual-arm tools is shorter than processing time at the processing module; and determining the optimized production schedule if the optimized production schedule exists, wherein the hybrid multi-cluster tool has a non-cyclic treelike structure with at least one of the single-arm tools and dual-arm tools being connected with three or more adjacent single-arm tools and dual-arm tools.

2. The method in accordance with claim 1, wherein the step of determining the time for individual operations of the robotic arm and the processing module in the plurality of single-arm tools and dual-arm tools comprises the step of determining one or more of:
- a time required for the robotic arm of the single-arm tool to load or unload the object;
- a time required for the robotic arms of the dual-arm tool to swap;
- a time required for the robotic arm of the single-arm tool or the dual-arm tool to move while holding the object;
- a time required for the robotic arm of the single-arm tool to move without holding the object;
- a time required for processing the object in the processing module of the single-arm tool or the dual-arm tool;
- a time required for resting the object in the processing module of the single-arm tool or the dual-arm tool;
- a time required for the robotic arm of the single-arm tool to wait before unloading the object;
- a time required for the robotic arms of the dual-arm tool to wait at the processing module of the dual-arm tool; and
- a time required for the robotic arms of the dual-arm tool to wait during swap at the processing module of the dual arm tool.

3. The method in accordance with claim 2, wherein the different connection relationships comprise:
- an upstream downstream relationship that includes an upstream single-arm tool and downstream single-arm tool connection, an upstream single-arm tool and a downstream dual-arm tool connection, an upstream dual-arm tool and a downstream single-arm tool connection, or an upstream dual-arm tool and a downstream dual-arm tool connection; and
- a number relationship that includes a number of adjacent single-arm or the dual-arm tools of which the respective single-arm tool or the dual-arm tool is connected to.

4. The method in accordance with claim 3, wherein the step of determining whether the optimized production schedule exists using the time for individual operations and the waiting time comprises:
- calculating an robot activity time of each of the single-arm tools and dual-arm tools in a production cycle without waiting using the time for individual operations;
- calculating a period of each of the single-arm tools and dual-arm tools using the time for individual operations;
- determining a maximum period from the calculated periods;
- determining a robot waiting time of each of the plurality of single-arm tools and dual-arm tools using the maximum period;
- evaluating the robot waiting time determined so as to determine if the optimized production schedule exists.

5. The method in accordance with claim 4, wherein the step of determining the optimized production schedule comprises setting an optimal robot waiting time for each of the plurality of single-arm tools and dual-arm tools based on the determination results without interfering with the operation of the buffering modules.

6. The method in accordance with claim 1, wherein the object is a semiconductor and the production line is a semiconductor manufacturing line.

7. The method in accordance with claim 1, wherein the optimized production schedule comprises a shortest time for completion of a cycle of production of the object.

8. A computerized system arranged to determine an optimized production schedule of a production line including a hybrid multi-cluster tool formed by a plurality of single-arm tools and dual-arm tools interconnected with each other; wherein each single arm tool includes one robotic arm for manipulating an object and at least one processing module for processing the object or a buffering module for holding the object, and each dual-arm tool includes two robotic arms for manipulating an object and at least one processing module for processing the object or a buffering module for holding the object; each single-arm tool and dual-arm tool are connected with each other through at least one buffering module; the computerized system comprising:
a Petri-Net (PN) model computation module arranged for:
- determining time for individual operations of the robotic arm and the processing module in the plurality of single arm tools and dual arm tools;
- determining robot waiting time of the single-arm tools and dual-arm tools based on the time for individual operations and different connection relationships of the plurality of single arm tools and dual arm tools;
- determining whether the optimized production schedule exists using the determined robot waiting time, wherein the optimized production schedule only exists if the hybrid multi-cluster tool is process-dominant where the robot activity time of the plurality of single-arm tools and dual-arm tools is shorter than processing time at the processing module; and
- determining the optimized production schedule if the optimized production schedule exists, wherein the hybrid multi-cluster tool has a non-cyclic treelike structure with at least one of the single-arm tools and dual-arm tools being connected with three or more adjacent single-arm tools and dual-arm tools.

9. The computerized system in accordance with claim 8, wherein determining the time for individual operations of the robotic arm and the processing module in the plurality of single arm tools and dual arm tools comprises determining one or more of:
- a time required for the robotic arm of the single-arm tool to load or unload the object;
- a time required for the robotic arms of the dual-arm tool to swap;
- a time required for the robotic arm of the single-arm tool or the dual-arm tool to move while holding the object;
- a time required for the robotic arm of the single-arm tool to move without holding the object;
- a time required for processing the object in the processing module of the single-arm tool or the dual arm tool;
- a time required for resting the object in the processing module of the single-arm tool or the dual arm tool;
- a time required for the robotic arm of the single-arm tool to wait before unloading the object;
- a time required for the robotic arms of the dual-arm tool to wait at the processing module of the dual arm tool; and a time required for the robotic arms of the dual-arm tool to wait during swap at the processing module of the dual arm tool.

10. The computerized system in accordance with claim 9, wherein the different connection relationships comprise:
- an upstream downstream relationship that includes an upstream single-arm tool and downstream single-arm tool connection, an upstream single-arm tool and a downstream dual-arm tool connection, an upstream dual-arm tool and a downstream single-arm tool connection, or an upstream dual-arm tool and a downstream dual-arm tool connection; and
- a number relationship that includes a number of adjacent single-arm or the dual-arm tools of which the respective single-arm tool or the dual-arm tool is connected to.

11. The computerized system in accordance with claim 10, wherein the Petri-Net (PN) model computation module is arranged to determine whether the optimized production schedule exists using the time for individual operations and the waiting time by:
- calculating an activity time of each of the single-arm tools and dual-arm tools in a production cycle without robot waiting using the time for individual operations;
- calculating a period of each of the single-arm tools and dual-arm tools using the time for individual operations;
- determining a maximum period from the calculated periods;
- determining a robot waiting time of each of the plurality of single-arm tools and dual-arm tools using the maximum period;
- evaluating the robot waiting time determined so as to determine if the optimized production schedule exists.

12. The computerized system in accordance with claim 11, wherein the Petri-Net (PN) model computation module is arranged to determine the optimized production schedule by setting an optimal robot waiting time for each of the plurality of single-arm tools and dual-arm tools based on the determination results without interfering with the operation of the buffering modules.

13. The computerized system in accordance with claim 8, wherein the optimized production schedule comprises a shortest time for completion of a cycle of production of the object.

14. The computerized system in accordance with claim 8, wherein the object is a semiconductor and the production line is a semiconductor manufacturing line.

* * * * *